United States Patent

Forney, Jr.

[15] 3,665,396

[45] May 23, 1972

[54] SEQUENTIAL DECODING

[72] Inventor: George David Forney, Jr., Lexington, Mass.

[73] Assignee: Codex Corporation, Watertown, Mass.

[22] Filed: Oct. 11, 1968

[21] Appl. No.: 766,738

[52] U.S. Cl. ......................340/146.1, 340/173 R, 340/172.5

[51] Int. Cl. ........................................H03k 13/34, H041 1/10

[58] Field of Search.................................235/92; 340/146.1

[56] References Cited

UNITED STATES PATENTS

| | | | |
|---|---|---|---|
| 3,457,562 | 7/1969 | Fano | 340/146.1 X |
| 3,475,724 | 10/1969 | Townsend et al. | 340/146.1 |

*Primary Examiner*—Eugene G. Botz
*Assistant Examiner*—R. Stephen Dildine, Jr.
*Attorney*—John Noel Williams

[57] ABSTRACT

An improved error-correcting decoder for convolutional codes, of the sequential decoding type, is described. By restriction of received digit quantization to hard decisions, the number of alternatives in a single decoding search move is made sufficiently small that an entire move can be completed in one cycle of a synchronous clock. An efficient organization of the decoder memory is disclosed in which the decoder logic circuitry operates on a small, fast memory, while a larger, slower bulk buffer memory interfaces with the channel, stores data, and exchanges bits with the small fast memory on demand. The bulk memory contains variable amounts of decoded and undecoded data, which together comprise a constant capacity. A new buffer memory employing untapped shift registers is described. Use of a syndrome-forming circuit to preprocess the data is disclosed. An automatic resynchronization method in which a number of stored syndrome bits are set to 0 is presented. These features in combination are employed to produce efficient communication at high data rates over satellite channels.

21 Claims, 19 Drawing Figures

Patented May 23, 1972 3,665,396

13 Sheets-Sheet 4

INVENTOR.
GEORGE D. FORNEY, Jr

SEQUENTIAL DECODING

This invention relates to an error correction decoder and to apparatus useful therefor.

It is a primary object of the invention to provide an efficient and inexpensive sequential decoder, capable of very rapid decoding rates. Other objects are to provide sequential decoder logic circuitry capable, when used with a suitable buffer, of decoding convolutional codes of various rates with various quantizations in the demodulation; to provide an improved method of decoder resynchronization; and to provide an improved buffer construction useful in sequential decoders and in serving other active devices.

According to one aspect of the invention, it is realized that a sequential decoder that offers a practical solution to the error problem found in satellite communications systems is achieved by the combination of an on-line system employing hard decisions as to the binary values of received digits, and a split memory having buffer storage for the undecoded sequence and for the decoded sequence (in which the two stored sequences vary in length but their combined length is a constant) and a separate active memory communicating with the buffer and interconnected with the sequential decoder logic circuitry.

Such a decoder may advantageously include a syndrome bit former constructed to form a sequence of syndrome bits, the decoder logic circuitry being constructed to progressively examine and modify the sequence and to form a decoded sequence as a binary sequence which indicates the error values for respective bits of the received data. The syndrome bit former may be included in an input circuit for the buffer thus requiring the buffer to transfer only syndrome bits to the active memory.

According to another aspect of the invention, it is realized that significant advantages are obtainable from the combination of a system employing hard decisions as to the binary values of received digits and a sequential decoder of general application.

The invention also features either of the aforementioned decoder arrangements including means for automatically resynchronizing the decoder logic circuitry upon the occurrence of a demand for output of data not finally decoded; the means being adapted to fill the active memory in such a way as to permit recommencement of the decoding procedure.

According to a further aspect of the invention, in the case of a sequential decoder which includes a syndrome bit former to form a syndrome bit sequence and in which the decoder logic circuitry is adapted to employ only syndrome bits with a sequential decoding search rule to produce a decoded sequence, the automatic resynchronization means advantageously comprises a means to set to 0 each of the syndrome bits in at least a constraint length of the syndrome bit sequence.

According to a still further aspect of the invention a simple, high speed sequential decoder is achieved by the combination of a system employing hard decisions as to the binary values of received digits and sequential decoder logic circuitry constructed to perform its decision and bit-shifting-and-altering functions in a single clock cycle.

More generally, for all the decoder arrangements mentioned, it is advantageous that systematic convolutional codes of rate one-half be employed, that the logic circuitry be constructed to perform its sequential decoding decision and bit-shifting-and-altering functions in a single clock cycle; that the logic circuitry consist only of gates and flip-flops; that the shift speed of the active memory, as controlled by the logic circuitry, be greater than the access speed of the buffer; that the decoder be an on-line system constructed to form a sequence of syndrome bits and employ only that sequence in its sequential decoding search; and that the aforementioned split memory be employed.

The preferred embodiment of the buffer memory according to the invention comprises at least two chains of series-connected shift registers and logic means adapted to track the boundary between shift registers containing an undecoded sequence and shift registers containing a decoded sequence, said logic means adapted to cause cross transfers of bits between the chains. The logic means preferably comprises a two-way shift register having as many stages as there are registers in each of the chains.

Other objects, features, and advantages will appear from the following description of preferred embodiments of the invention, taken together with the attached drawings thereof; in which.

For the background of the invention the reader is referred to the following:

Sequential decoding; general

J. McR. Wozencraft and B. Reiffen, *Sequential Decoding*, MIT Press-Wiley, New York, 1961;

R. M. Fano, "A Heuristic Discussion of Probabilistic Decoding," *IEEE Transactions on Information Theory*, IT–9, 64–74 (1963);

R. G. Gallager, MIT course notes for course 6.574 (to appear as *Information Theory and Reliable communication*, Wiley, New York, 1968.);

J. McR. Wozencraft and I.M. Jacobs, *Principles of Communication Engineering*, Wiley, New York, 1965, Chapter 6.

Sequential decoding; hardware

K. M. Perry and J. McR. Wozencraft, "SECO: A Self-Regulating Error-Correcting Coder-Decoder," *IRE Transactions Information Theory*, IT–8, (1962);

I. L. Lebow and P. G. McHugh, "A Sequential Decoding Technique and Its Realization in the Lincoln Experimental Terminal," *IEEE Transactions on Communication Technology*, COM–15, 477–92 (1967).

Digital hardware; state of the art

Y. Chu, *Digital Computer Design Fundamentals*, McGraw-Hill, New York, 1962.

GENERAL DISCUSSION

Figures 1, 1A:
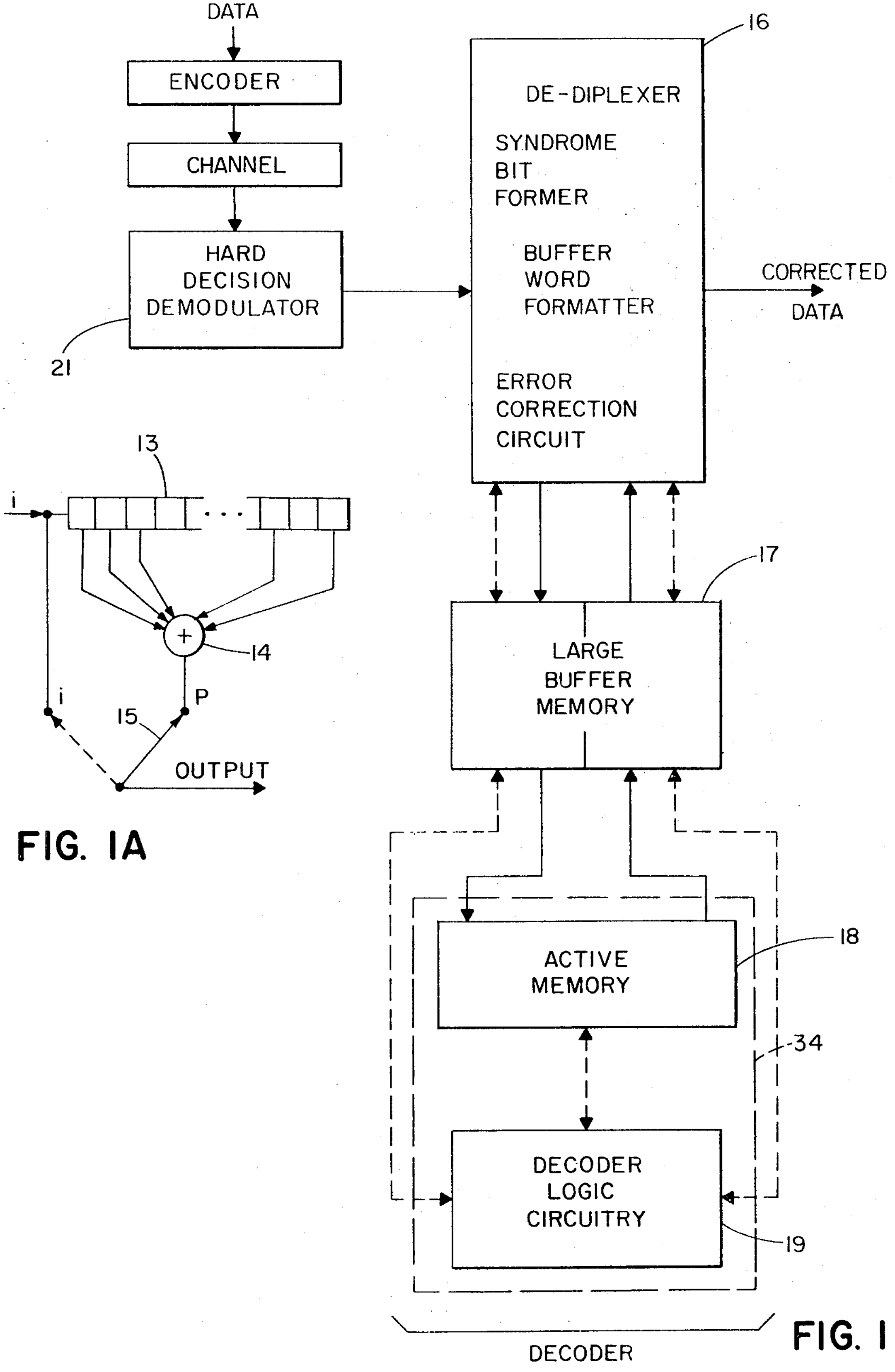
FIG. 1 is a block diagram of an information storage or transmission system.
FIG. 1A is a schematic diagram of an encoder for a convolutional code.

FIG. 1 is a block diagram showing the relation of a sequential decoder according to the invention to the other elements of the system. Data digits are encoded and transmitted. Received digits enter into the sequential decoder. The solid arrows in FIG. 1 represent data transfers and the dotted arrows represent control interconnections.

FIG. 1A illustrates a convolutional encoder suitable for use in the system of FIG. 1. Normally information bits will be arriving serially at a steady rate (i.e., synchronously). The information bits serially enter shift register 13. The taps from register locations lead to modulo 2 adder 14 which computes a parity check digit for each shift of register 13. Diplexer 15 causes information digits ($i$'s) and parity digits ($p$'s) to be alternately transmitted to the channel.

The preferred embodiments to be described are syndrome decoders designed to decode a rate one-half systematic error correction convolutional code on a channel with binary "hard decision" inputs and outputs. A specific example of such of a systematic convolutional code, with a constraint length of 45, is as follows (where a "1" indicates a tapped element of the encoder memory of FIG. 1A, and "0" indicates an untapped element): 11100110110011101111000001011 001111100110101.

According to an important feature of the invention the memory of the sequential decoder is divided as in FIG. 1. An active memory 18 is combined with the sequential decoder logic circuitry 19 and has a length equal to at least a plurality of constraint lengths of the particular convolutional code employed. The buffer memory 17 has a greater capacity. The decoder logic circuitry 19 is adapted to perform its sequential decoding search by examination of the sequence stored in the active memory 18, the active memory 18 providing access to stored digits at speeds of the order of magnitude of the operational speed of the logic circuitry. The buffer memory is adapted on demand of the logic circuitry to supply fresh digits and remove processed digits from the active memory. According to another aspect of the invention the buffer memory is adapted to receive input digits and supply output digits strictly at one half the channel rate, while being adapted to supply and remove digits to and from the active memory at varying intervals, on demand of the logic circuitry. The input circuit 16 performs various functions for the decoder. For example, it may contain a de-diplexer; a syndrome bit former; a buffer word formatter; or an error correction circuit. The details of operation of these elements, however, will be omitted, being well known in the art and forming no part of the invention herein.

Figure 2:
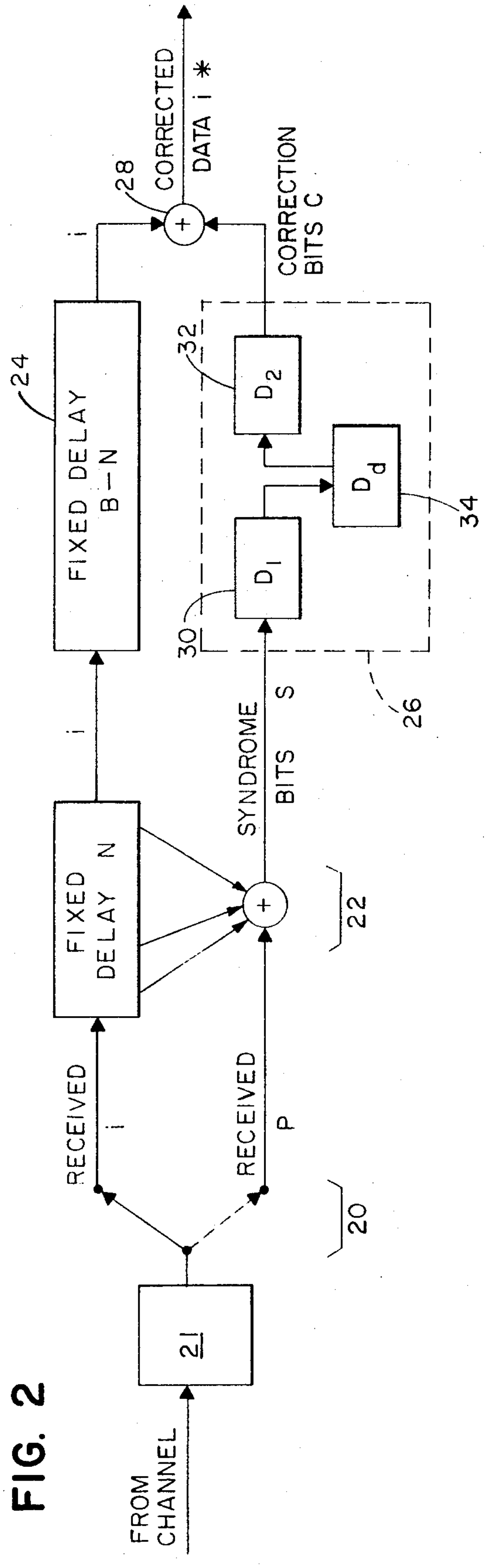
FIG. 2 is a block diagram of a decoder according to the invention.

FIG. 2 is a block diagram of a syndrome sequential decoder according to a preferred embodiment of the invention, showing in particular the split memory configuration. In this figure, signals from the channel enter unit 21 which makes a "hard decision" as to the binary value of each signal. That is, unit 21 is constructed to decide if the signal represents a 0 or a 1 and puts out a corresponding 0 or 1 without any indication of the probability that the decision was correct. Number 20 denotes a de-diplexer which separates the received data into separate information bit, $i$, and parity bit, $p$, streams. Syndrome bits, the raw material for the decoder logic, are formed by syndrome bit former 22 which adds to the received parity bit a corresponding parity bit formed of received information bits, so that all information components are added-out and the syndrome bit depends only on the channel errors.

The syndrome bit former delays the information bits for a fixed time, N. The information bits, $i$, then enter fixed delay 24 of length B–N bits from which they subsequently emerge to be modulo 2 added to the correction bits, $c$, to produce corrected information bits, $i^*$. It is apparent that the total delay of the correction bit former, indicated generally by 26, must be B so that a correction bit reaches the error correction circuit 28 (viz., a modulo 2 adder), at the same time as the corresponding information bit.

The correction bit former 26 comprises syndrome bit buffer 30, correction bit buffer 32, and active decoder device 34. The active decoder device comprises the active memory 18 and the decoder logic circuitry 19 of FIG. 1. Syndrome bit buffer delay is denoted by $D_1$, correction bit buffer delay by $D_2$, and active decoder device delay by $D_d$, with the relationship that $$D_1 + D_2 + D_d = B.$$

According to the present invention $D_1$ and $D_2$ are each variable delays; whereas $D_d$ and $B$ (the latter being the sum of N and (B–N)) are fixed.

The active decoder device 34 obtains syndrome bits from buffer 30. It examines these bits for a variable length of time, in accordance with a search plan, to find the most likely pattern of errors in the received data, and forms correction bits. (The preferred operation of the active decoder device is described in detail below.) The correction bits so formed are deposited in buffer 32.

If buffer 30 should fill up with syndrome bits and buffer 32 should be empty of correction bits the active decoder device 34 is commanded to enter a resynchronization mode until normal decoding is re-established. The resynchronization strategy is discussed below.

The active decoder device 34 requires at each transfer from buffer 30 a predetermined number, Q, of syndrome bits. If buffer 30 should contain less than Q bits when active decoder device signals for Q more bits, a "decoder idle" signal is transmitted to active decoder device 34 which causes this device to idle until Q syndrome bits have accumulated in buffer 30.

With the equipment presently available the preferred construction of the decoder according to the invention depends upon the decoder memory size required by the specific application to which the decoder is put. It has been found advantageous to employ a core memory if a capacity of the order of 10,000 bits, or greater, is required. Where a smaller memory is satisfactory, a shift register embodiment is preferred as less expensive.

It is realized that the error correction decoder described and claimed herein leads to a solution of the error problem on a communications channel between two earth stations via a communications satellite, although its usefulness is not limited thereto.

Preferred embodiments of each of the two types of buffer memory units mentioned above will now be more particularly described.

SHIFT REGISTER EMBODIMENT OF BUFFER MEMORY

From the preceding discussion it is apparent that the system of buffers comprising buffers 30 and 32 advantageously has certain features. Thus buffer capacities $D_1$ and $D_2$ should be variable, but related so that $$D_1 + D_2 = \text{constant}.$$

Also, the syndrome bit buffer 30 should be capable of delivering the next Q syndrome bits to the active decoder device 34 at any time despite the fact that new syndrome bits are being received. Similarly, buffer 32 should be capable of receiving a group of Q correction bits at any time despite the fact that correction bits may simultaneously be demanded of this buffer.

It has been found possible to achieve these features and, as well, to physically separate the buffer memory system from the active decoder device 34, to combine buffers 30 and 32 into a single buffer memory of fixed total length, and to build the single buffer memory in an efficient and inexpensive modular construction.

Figure 3:
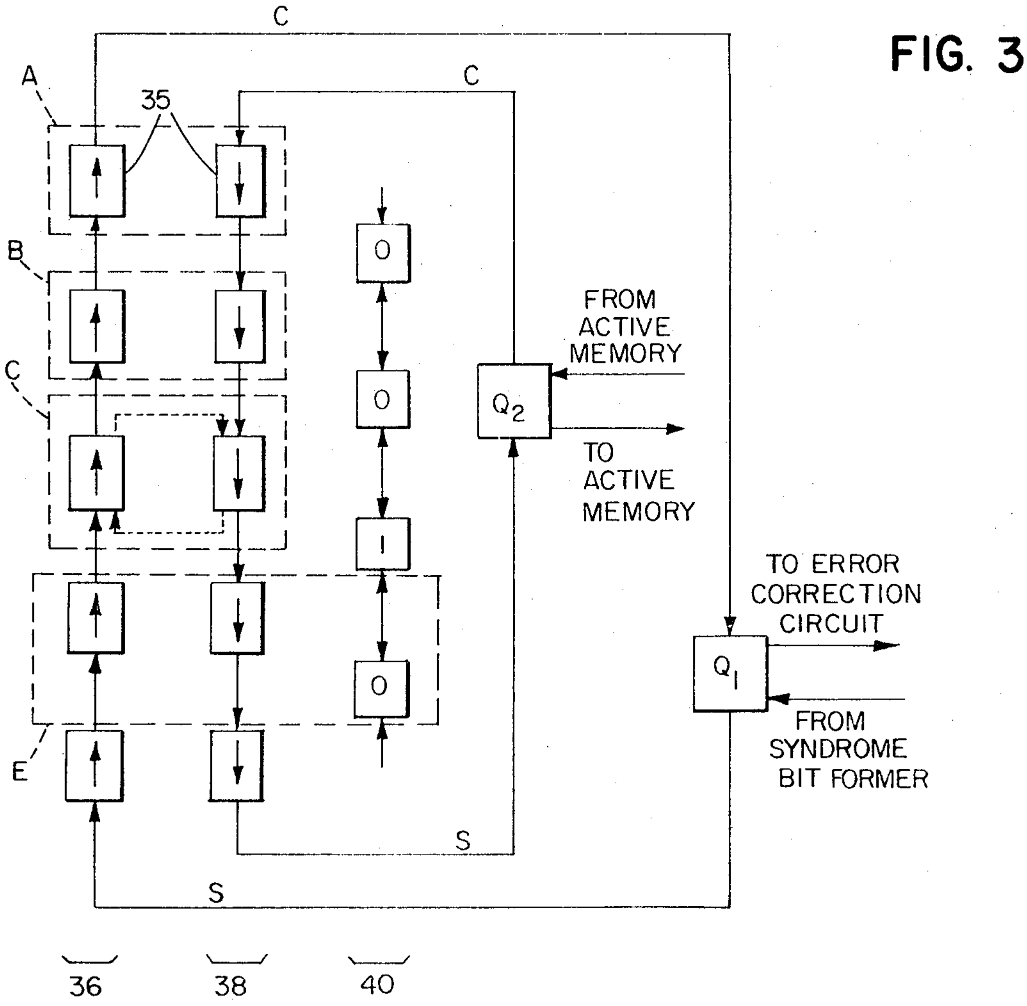
FIG. 3 is a block diagram of the configuration of shift registers in a buffer according to the invention adapted for use in the decoder of FIG. 2.

In the preferred embodiment the buffer memory system is constructed of untapped one-way shift registers 35, as illustrated schematically in FIG. 3, the bit length of every shift register being the same; e.g. $M$ bits. The basic or normal interconnection of these shift register elements is as two long one way shift registers 36 and 38, as in FIG. 3. However, a logic device is provided to enable cross-transfers of bits between the two chains, as illustrated in FIG. 3 by the dashed arrows in element C. At any one time, a cross-transfer may be set up in only one place. The location of this place is determined by a two-way shift register 40 which has as many stages as there are pairs (A, B, C, etc.) of M-bit registers in the two chains 36 and 38. Only one of the stages of register 40 contains a "1" at any time, corresponding to the cross-transfer location. In the shift register chains 36 and 38 all of the upper registers contain correction bits (*c*'s) and all of the lower registers contain syndrome bits (*s*'s). The "1" in a two-way shift register 40 thus acts as a boundary tracker to denote the boundary between buffers 30 and 32 of FIG. 2.

This buffer memory device accepts and provides bits in groups of 2M bits. It is triggered asynchronously (1) when 2M syndrome bits have accumulated in a small external buffer $Q_1$, or (2) when the active decoder device requests 2M syndrome bits. Event (1) causes the buffer to do the following:

a. In the normal shift register interconnection, 2M syndromes are shifted up into left-hand chain of registers 36 and 2M correction bits are shifted out and proceed to the small external 2M-bit buffer $Q_1$ from which they proceed to error correction circuit 28 as in FIG. 2. The right-hand chain of registers 38, is unchanged. The two-way shift register 40 is shifted up one place.

b. A cross-transfer interconnection is established as indicated by the dashed arrows in element *C* in FIG. 3 and M bits are shifted from the left to the right chain and vice versa.

Similarly, event (2) causes the buffer to go through actions ($a'$) and ($b'$) where ($b'$) is the same as ($b$) and in action ($a'$) 2M correction bits are shifted from the decoder down into right-hand chain of registers 38 and 2M syndrome bits are shifted out and proceed to the decoder, while the left hand chain 36 remains unchanged and the tracker register 40 is shifted down one place.

The effect of these rules is the following: The "1" in the two-way tracker shift-register 40 can be thought of as denoting the boundary between the part of the register used for storing syndrome bits (the delay $D_1$ of buffer 30 in FIG. 2) and the part used for correction bits (the delay $D_2$ of buffer 32 in FIG. 2).

As noted above, external 2M-bit buffer $Q_1$ must be provided in addition to the buffer chains 36,38,40 for interfacing with the outside of the correction bit former 26. Similarly, such a buffer $Q_2$ must be provided for interfacing with the active decoder memory. If, however, $2M=Q$, the separate buffer for interfacing with the active decoder memory is redundant.

Figure 4:
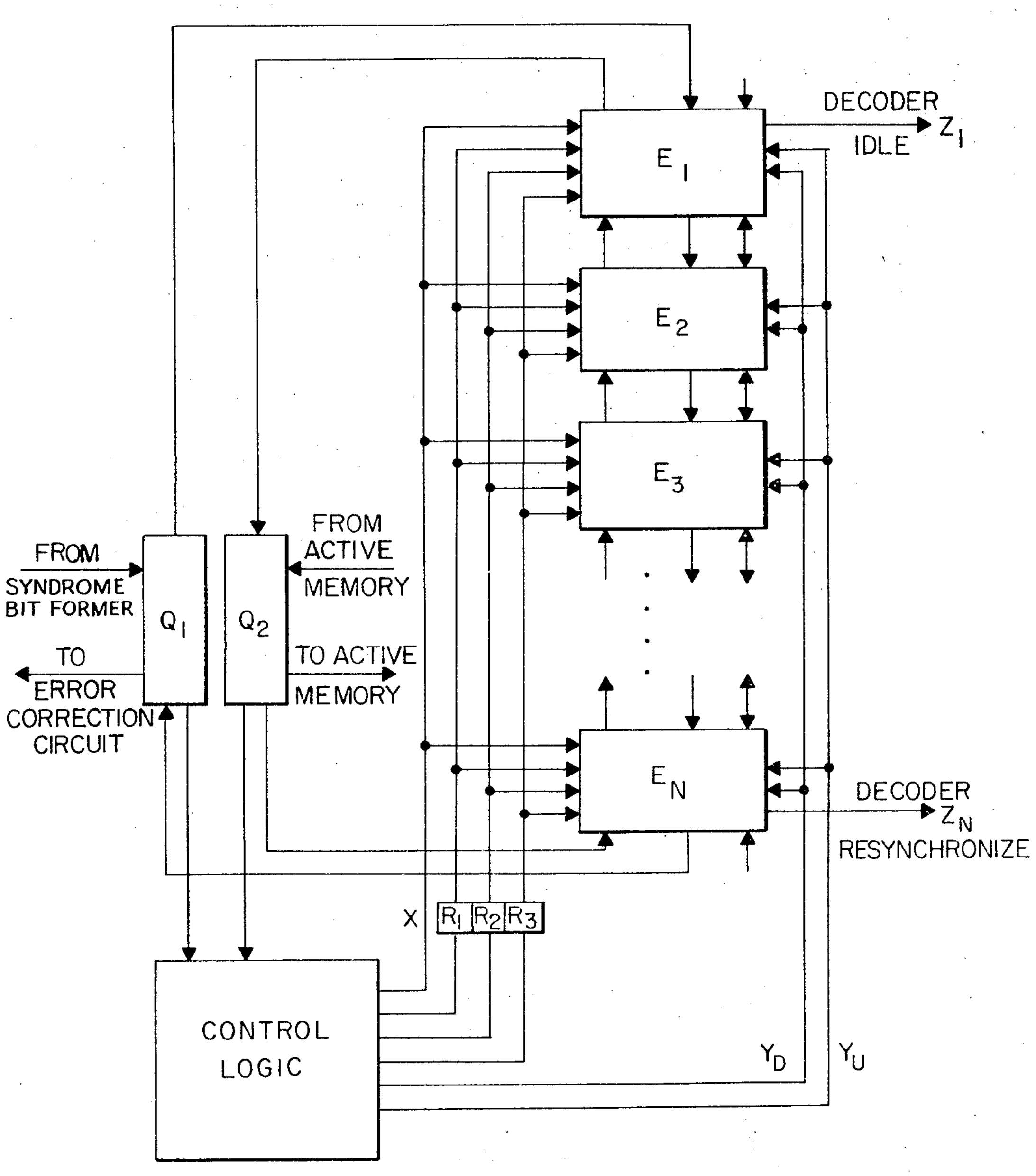
FIG. 4 is a schematic diagram of an entire buffer system according to the invention, implementing the shift register configuration of FIG. 3.
Figure 5:
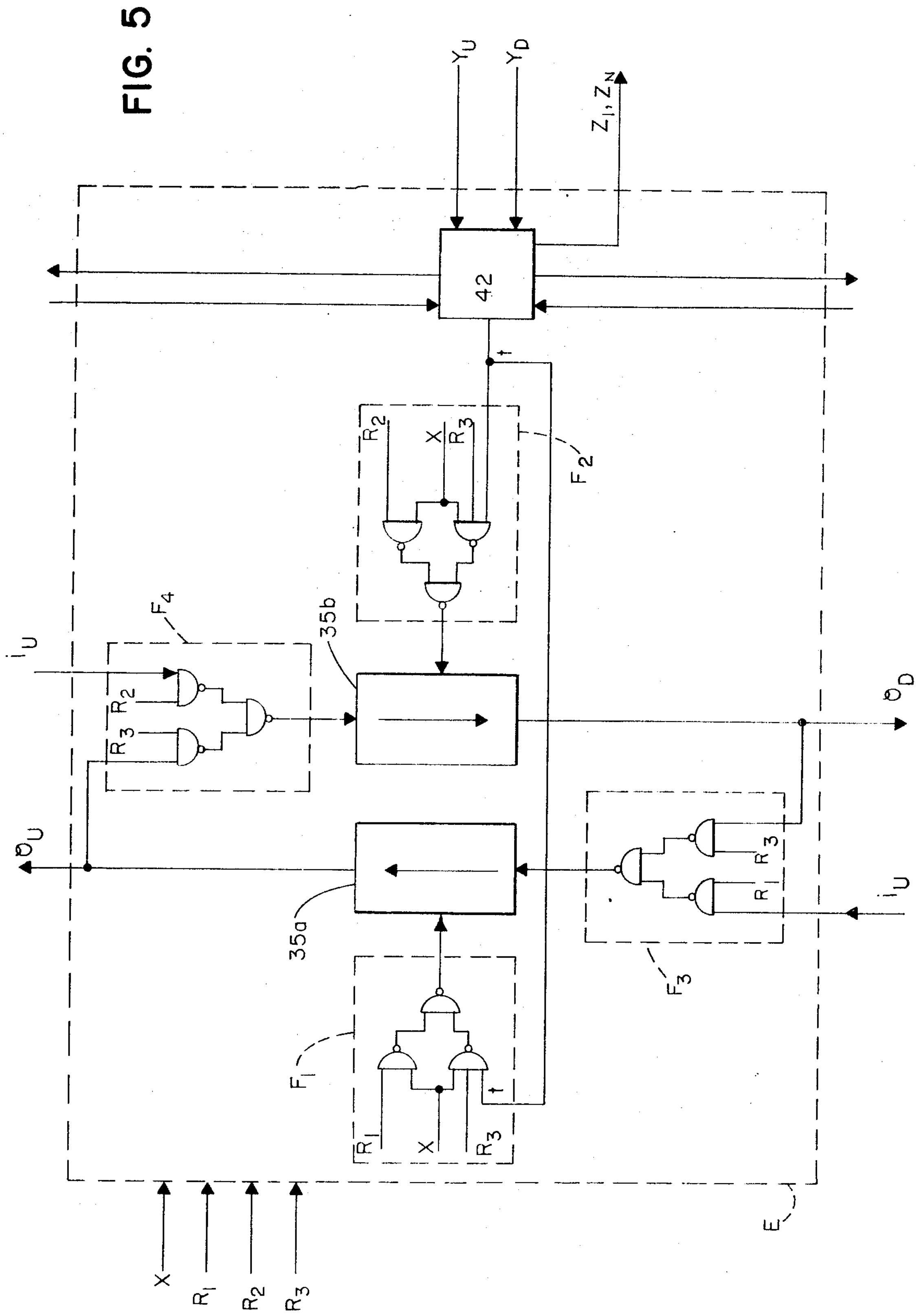
FIG. 5 is a schematic diagram of one buffer element of FIG. 4.

In the more detailed illustration of FIG. 4, each block labeled $E_l$ through $E_n$ is an element of buffer memory. These elements correspond to the contents of the dashed-line box labeled "E" in FIGS. 3 and 5. The operation of the buffer system of FIG. 4 is easily understood once the operation of each element E is explained. Therefore, the detailed illustration of such an element in FIG. 5 is now considered.

The contents of each one-way shift register 35*a* and 35*b* may be either M syndrome bits (M *s*'s) or M correction bits (M *c*'s), as explained above. Whether *c*'s or *s*'s will depend upon the location of the "1" in the two-way shift register 40, illustrated in FIG. 3. The stage of the two-way shift register 40 in element E is denoted 42 in FIG. 5. $F_1$, $F_2$, $F_3$, and $F_4$ represent combinational circuitry devices. These devices are constructed, in a manner well-known in the art, to achieve the following results:

$F_1$ When a clock pulse, denoted by $x$, is received from the control device, (illustrated in FIG. 4) and when at the same time either a signal $R_1$ or signals $R_3$ and t are received; then $F_1$ shifts every bit up one stage in M-bit shift register 35*a*.

$F_2$ When a clock pulse $x$, is received and when at the same time either a signal $R_2$ or signals $R_3$ and $t$ are received; then $F_2$ shifts every bit down one stage in M-bit shift register 35*b*.

$F_3$ When a bit, denoted $i_U$ (denoting "in" and "up") is shifted up from the buffer element below the one being discussed and at the same time signal $R_1$ is received; then that bit is passed through to M-bit shift register 35*a*. Also, when a bit, denoted $0_D$ (i.e., "out" and "down"), is shifted down out of register 35*b* and at the same time signal $R_3$ is received; then that bit is passed through to register 35*a*.

$F_4$ When a bit, denoted $i_D$ (i.e., "in" and "down"), is shifted down from the buffer element above the one being discussed and at the same time signal $R_2$ is received; then that bit is passed through to register 35*b*. Also, when a bit, denoted $0_u$ ("out" and "up"), is shifted up out of register 35*a* and at the same time signal $R_3$ is received; then that bit is passed through to register 35*b*.

The contents of stage 42 of two-way shift register 40 is shifted up on signal $Y_u$ and down on signal $Y_D$.

When the stage 42 in element $E_l$ of FIG. 4 contains the "1" a "decoder idle" signal, denoted $Z_l$, is generated. When stage 42 in element $E_n$ contains the "1" a "decoder resynchronize" signal, denoted $Z_n$, is generated. (Resynchronization is discussed below.)

Figure 4A:
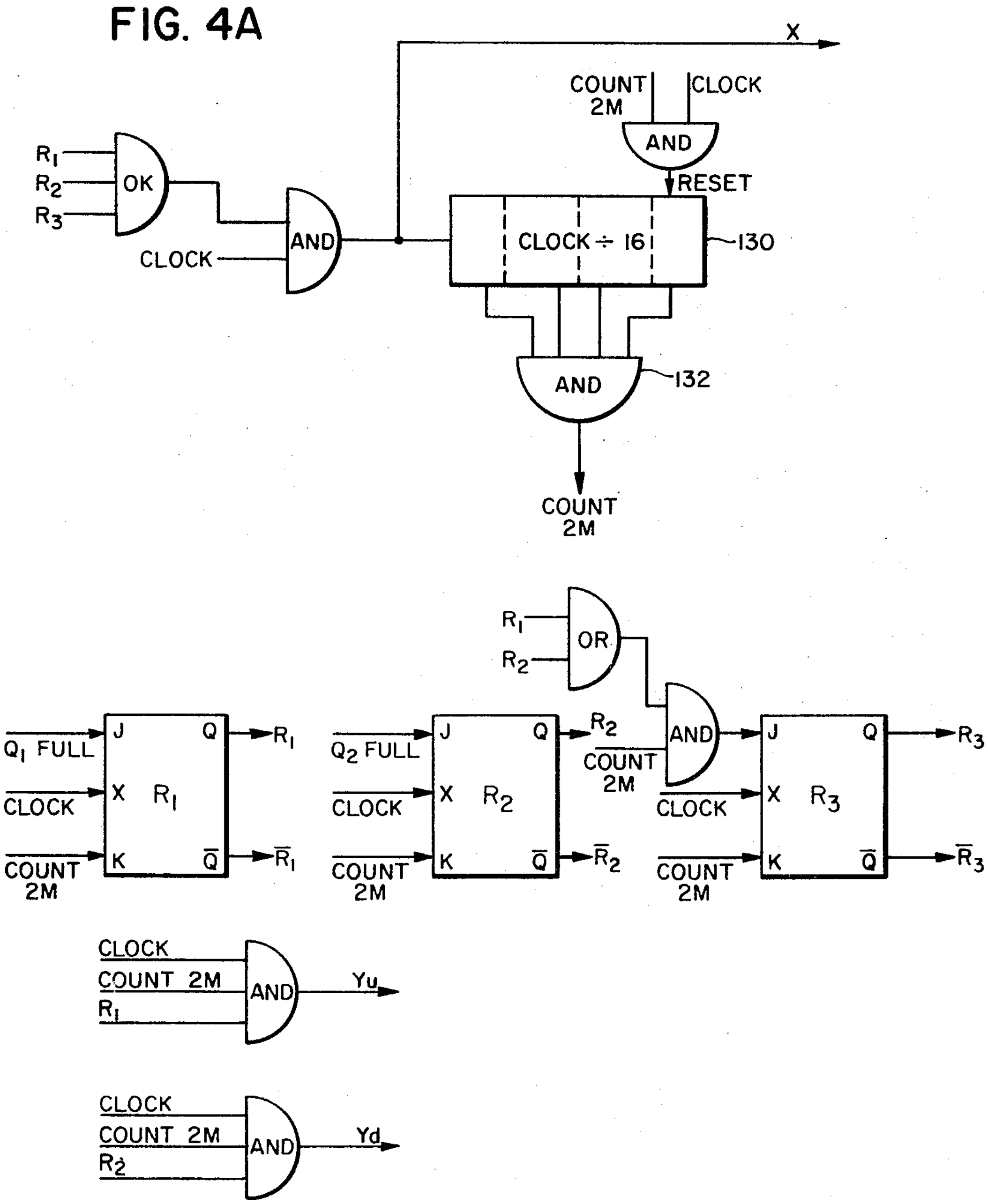
FIG. 4A is a schematic diagram of a portion of the buffer system of FIG. 4.

The control logic unit of FIG. 4 is shown in more detail in FIG. 4A. The logical elements include a counter 130 which counts to $2M$ and can be reset to 0, where the reset overrides the input clock. The logical signal "count $2M$" is developed by gating 132 when the count equals $2M - 1$. In the example of FIG. 4A, $M=8$. $R_1$, $R_2$, and $R_3$ are so-called "master-slave J-K flip-flops." $R_3$ is reset at the end of the cycle. The control logic unit of FIG. 4A is constructed in a manner well-known in the art to achieve the following operation:

Whenever buffer $Q_1$ signals that it has accumulated 2M syndrome bits, by the logical signal "$Q_1$ FULL"; then $R_1$ is set, the clock X is pulsed 2M times, $Y_u$ is pulsed, $R_1$ is then reset, $R_3$ is set, and X is pulsed 2M times, $R_3$ is reset; whenever buffer $Q_2$ signals that it has accumulated 2M bits, by the logical signal "$Q_2$ FULL", then $R_2$ is set, X is pulsed 2M times, $Y_D$ is pulsed, $R_2$ is then reset, $R_3$ is set, X is pulsed 2M times, and $R_3$ is reset. In FIG. 4A, "clock" is a high-speed clock from which the necessary pulses are derived.

Figure 6:
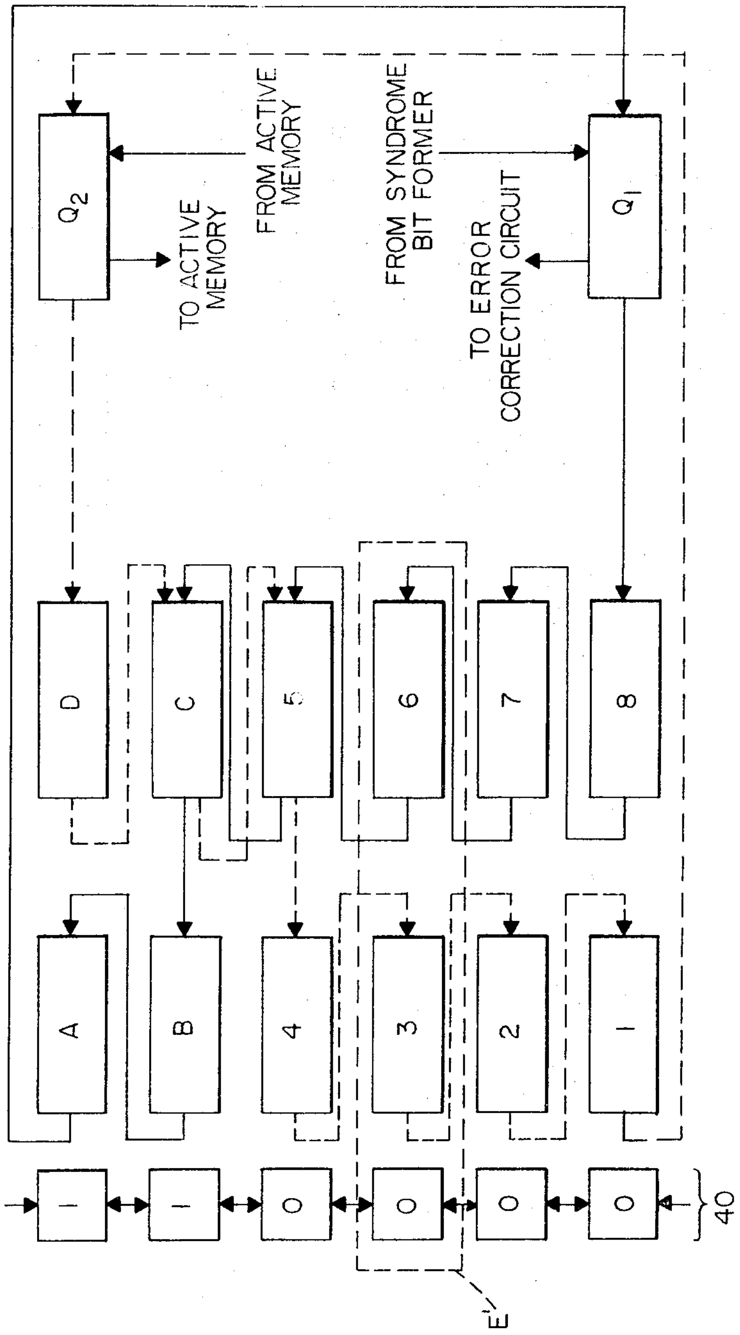
FIG. 6 is a block diagram of an alternative buffer embodiment according to the invention.

An alternative shift register embodiment of the buffer system, illustrated by the block diagram of FIG. 6, reduces from 4M to 2M the number of shifts required to shift 2M bits into the buffer.

Again the buffer comprises a plurality of M-bit untapped one-way shift registers. In FIG. 6 these registers are labelled 1 through 8 and A through D. Shift registers $Q_1$ and $Q_2$ (each of 2M-bit capacity) and two-way shift register 40 are as described above in connection with FIGS. 4 and 3. Thus register 40 again acts as a boundary tracker. A slight modification is introduced, however, in that all stages of register 40 above the boundary between correction and syndrome bits contain "1" and all stages below the boundary contain "0". Thus, in FIG. 6, M-bit registers A through D contain correction bits and M-bit registers 1 through 8 contain syndrome bits; the lower numbers and earlier letters denoting earlier entered bits.

The entering of 2M bits from $Q_1$ and $Q_2$ into a buffer with the correction bit and syndrome bit configuration of FIG. 6 are illustrated by solid and dashed arrows respectively. It is apparent from FIG. 6 that only 2M shifts occur within the buffer comprised of the 12 untapped one-way M-bit shift registers as 2M new bits are received.

Figure 7:
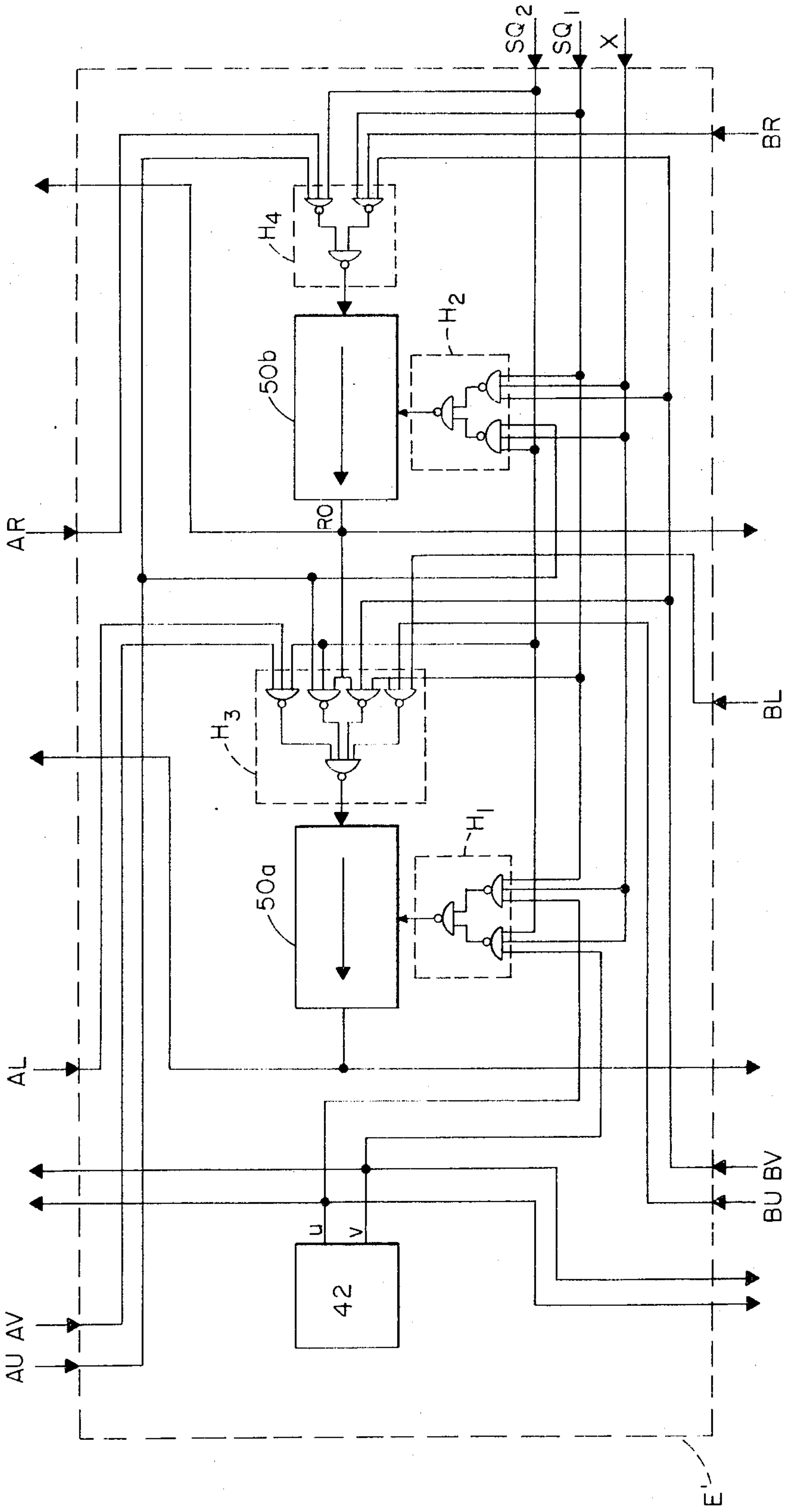
FIG. 7 is a schematic diagram of one element of a buffer system employing the buffer of FIG. 6.

FIG. 7 is a block diagram of one element of a buffer of this embodiment. This figure is therefore analogous to FIG. 5.

In FIG. 7, 50*a* and 50*b* are left and right one-way M-bit shift registers; 42 is a stage of two-way shift register 40, with outputs U or V if stage 42 contains a "1" or a "0" respectively; AU and AV are similar outputs from the stage above this one; BU and BV are similar outputs from the stage below this one; AL and AR are the outputs from the left and right M-bit registers, respectively, of the element above this one; BL and BR are the outputs from the left and right M-bit registers, respectively, of the element below this one; X is a clock pulse; $SQ_1$ is a signal generated when an exchange with buffer $Q_1$ (see FIG. 6) occurs; $SQ_2$ is a signal generated when an exchange with buffer $Q_2$ (see FIG. 6) occurs; and RO is the output of register **50*b***. $H_1$, $H_2$, $H_3$, and $H_4$ are combinational circuitry devices. These devices are constructed, in a manner well-known in the art, to achieve the following results:

$H_1$ When a clock pulse, X, is received and when at the same time either signals $SQ_2$ and V or signals $SQ_1$ and U are received; then register **50*a*** is shifted one bit to the left.

$H_2$ When a clock pulse, X, is received and when at the same time either signals $SQ_2$ and AU or signals $SQ_1$ and BV are received; then register **50*b*** is shifted one bit to the left.

$H_3$ This device passes a data bit through to register **50 *a*** upon the receipt of any of the following groups of signals 1. signals $SQ_2$, AL, and AV;
2. signals $SQ_2$, RO, and AU;
3. signals $SQ_1$, BL, and BU; or
4. signals $SQ_1$, RO, and BV.

$H_4$ This device passes a data bit through to register **50*b*** upon receipt of signals $SQ_2$, AR and AU or upon receipt of signals $SQ_1$, BR, and BV.

CORE MEMORY EMBODIMENT OF BUFFER MEMORY

In the case in which the total decoder memory is to be large, say 10,000 bits or more, it is most economical at the present time to employ a bulk memory, such as a magnetic core memory, as the buffer memory rather than serial shift registers. The following description indicates how such a memory may be made to serve as a buffer memory according to the functional diagram of FIG. 2.

An embodiment will be described in which the simple delay of the information bits by B–N (see delay 24 of FIG. 2) is incorporated in the core memory along with the buffer memory. Whether this delay is so realized or not is an economic question resting on the relative cost of additional core memory as against a separate untapped shift register (digital delay line).

Figure 8:
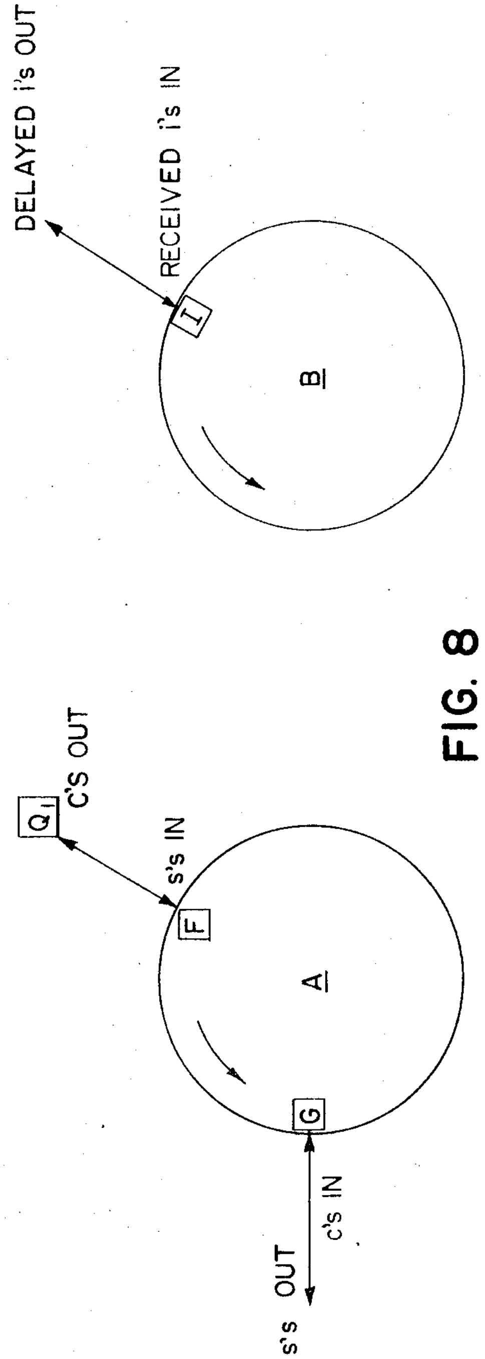
FIG. 8 is a diagrammatic illustration of a core memory embodiment of a buffer according to the invention.

Conceptually, the core memory may be thought of as divided into two rings of substantially identical capacity, as illustrated in FIG. 8. Ring B of FIG. 8 implements the simple information bit delay. Let W be the core word size. Whenever W information bits accumulate in a small external buffer (not shown), they are read into a certain location on the ring determined by address register I, and W information bits, deposited in that address (B–N)/W accesses earlier, are read out into the external buffer and thus are available for delivery to error correction circuit 28 of FIG. 2. Address register I is then incremented by 1 to prepare for the next access. The address register counts to (B–N)/W and then resets to 0. Thus a complete cycle involves (B–N)/W accesses and the desired delay of (B–N) is obtained.

Ring A of FIG. 8 is accessed both by a small external syndrome-correction bit buffer $Q_1$ and by the active memory. The locations of the accesses are determined by address registers F and G. Whenever W syndrome bits accumulate in the external buffer $Q_1$, they are read into the core at the location specified by F. In the same cycle W correction bits (corresponding to $D_1 + D_2$ time units earlier ) are read out ready to correct the corresponding delayed information bits. At the end of the cycle address register F is incremented by one. The size of ring A must therefore be $(D_1+D_2)/W$ words, which is assured by resetting the address registers F and G to 0 after $(D_1+D_2)/W$ counts, each address register being counted up one unit after an access. Whenever the active memory has W correction bits ready to be exchanged, it reads them out into the address specified by G, reads in W fresh syndrome bits, and finally increments G by 1 count. Whenever address register G catches up to address register F, the decoder is made to idle until fresh syndrome bits become available. Whenever address register *F* catches up to address register G, the resynchronization procedure is initiated. A core control unit maintains these address registers, determines service priorities, generates timing, and issues the control signals described.

Should a plurality of decoders for independent data streams be required at the same location, the same core memory may advantageously be shared between them, with the core control unit determining priorities of service. This feature is a desirable consequence of the invention wherein the active memory is implemented separately from the buffer memory.

ACTIVE MEMORY

The active memory according to the invention is extremely fast and simple by virtue of use of a rate one-half code with binary hard decision bit inputs. Since the active memory must be only of such length as is required in a single search, it is economically feasible to construct this memory out of fast logic components, which permits otherwise unattainably high rates, and is the key to practical application of the sequential decoding technique on satellite communications circuits.

Figure 9:
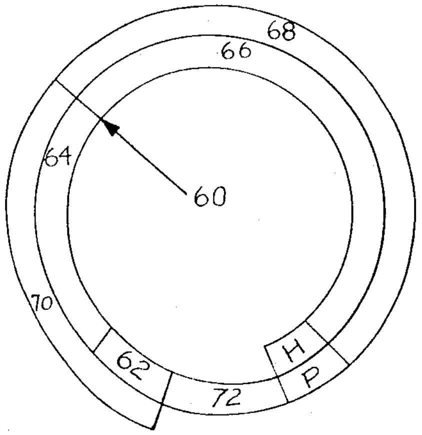
FIG. 9 is a schematic illustration of a spiral configuration of an active memory according to the invention.

The active memory is basically two linked parallel two-way shift registers, each of which will have total length of the order of a plurality of constraint lengths of the code employed. FIG. 9 illustrates a spiral configuration of the active memory. The spiral is conceptually divided into past and future by a boundary 60 whose location may be given by an up-down counter. A certain Q-bit segment, 62, of the spiral is used as an input-output buffer; at exchange time it contains the correction bits to be delivered to the buffer memory and accepts the Q fresh syndrome bits from the buffer. The segment of the spiral containing fresh syndrome bits is labeled 64, and the segment containing tentatively determined correction bits is labeled 66. The segments 68 and 70 contain hypothesized parity bit errors and dummy bits, respectively. AS will be explained when the decoder logic circuitry is described, the tentative correction bits may be called "hypothesized information bit errors." Finally 72 is a section of active memory in which syndrome bits are modified, according to information bit error hypotheses, by complementation of all syndrome bits which have as a term an information bit currently under consideration. The bits in section 72 will be referred to as "modified syndrome bits."

Under the control of the decoder logic, which requires as inputs the two bits labeled *H* and *P* in FIG. 9, the shift register shifts backwards and forwards. (In our illustration 'backwards' is clockwise and 'forwards' counter-clockwise.) *H* is the correction bit currently being formed, and P is the modified syndrome bit currently being decoded. Whenever the register is shifted forward to the point where the boundary 60 meets the edge of section 72, the Q correction bits next to the boundary are read out to the buffer memory and are replaced by Q new syndromes, whereupon the boundary is correspondingly moved over Q places. The decoder then resumes its search.

With use of commercially available digital logic components, such as high-speed transistor-transistor logic (as, for example, the Texas Instruments Series 74*H*), the logic and the active memory can be driven at a clock speed of the order of 20 MHz.

Figure 10:
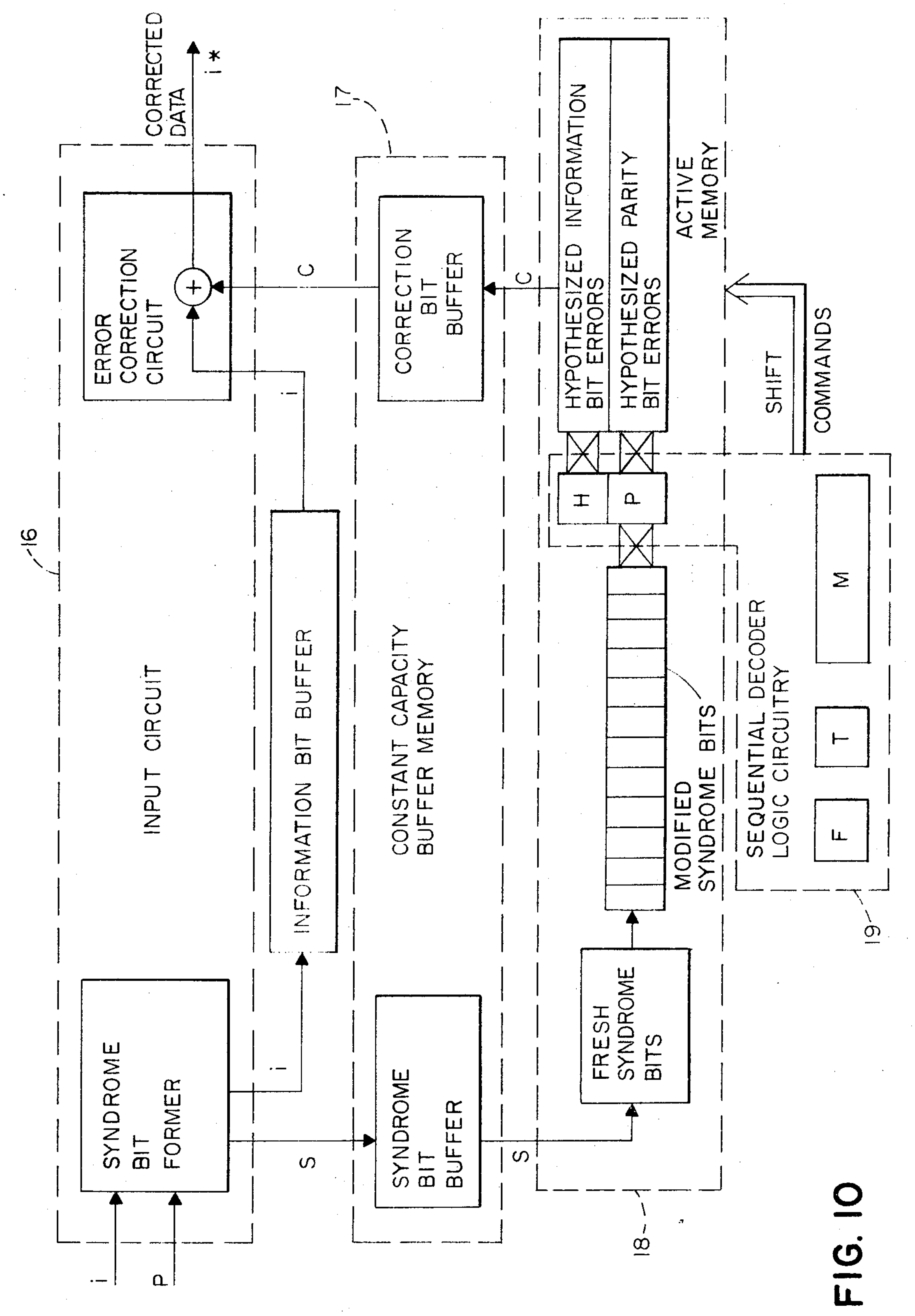
FIG. 10 is a schematic illustration of the interrelationship of portions of a decoder according to the invention.

FIG. 10 schematically illustrates the relationship of the active memory to the other portions of the decoder. In this illustration the parallel shift registers of the active memory have been "uncoiled" to simplify the description. The "undecoded sequence" referred to herein comprises the contents of the syndrome bit buffer in FIG. 10 as well as the sequence of fresh syndrome bits and modified syndrome bits in the active memory. The "decoded sequence" as referred to herein comprises the contents of the correction bit buffer and the hypothesized information bit errors contained in the active memory.

The interconnection between the active memory and the sequential decoder logic circuitry, schematically indicated in FIG. 10, will be described in detail below.

SEQUENTIAL DECODER LOGIC CIRCUITRY

As is known sequential decoders employ data that has been encoded by convolutional error-correcting codes. On the basis of the received encoded data the decoder operates sequentially, bit by bit, making hypotheses as to the existence and location of errors. It examines the effect that these hypothesized errors would have had on the encoded data stream. A running count is kept of the hypothesized errors, and if this count grows too large too fast, the decoder changes previous hypotheses in an effort to reduce the error count, according to a predetermined set of search rules (i.e., a search algorithm).

Two different embodiments of sequential decoder logic circuitry will be described which follow basic principles similar to those of the Fano Algorithm (as described in Wozencraft and Jacobs, *Principles of Communication Engineering*, Wiley, New York, 1965, Chap. 6), and employ in combination, according to the invention, rate one-half binary codes, hard binary decisions as to the output of the channel, and examination only of a sequence of syndrome bits formed from the received data. In both embodiments it is illustrated that a complete "computation" (decoding decision and action required thereby) can be made in a single clock cycle with just a few levels of gating.

The first embodiment implements the Fano algorithm with important modifications which result in extremely simple logic circuitry. The modifications also permit every backward move in the decoding search to force a change in a bit representing a hypothesized information bit error and in the syndrome bits having that information bit as a constituent. While this introduces otherwise unnecessary computations, it reduces the complexity of the sequential decoding logic circuitry and greatly simplifies the complementing means.

The second embodiment implements an algorithm essentially equivalent to the Fano algorithm itself.

In each embodiment the modified syndrome bits, when examined by the decoder, are treated initially as hypothesized parity errors. That is, if a particular syndrome bit (in location $P$ of the active memory) is a "1," an error in the parity bit component of that syndrome bit is first hypothesized; if the syndrome bit is a 0, the first hypothesis is no error in either that parity bit or the corresponding information bit (being that information bit which appeared in no previous syndrome bits). If the error count grows too large too fast the hypothesis is changed, as described below, to hypothesize an error in the corresponding information bit, this hypothesis stored tentatively as a correction bit, and the syndrome bits in which the information bit is a term are complemented.

Referring to FIG. 10, the principal inputs to the decoder logic circuitry are the information and parity error hypotheses (called $H$ and $P$) taken from a particular point in the active memory, called the search point. The principal output is the shift direction command, implementing the decisions to shift the contents of the two ranks of active memory to the left (backward) or to the right (forward). In the second embodiment another output is the complement command, implementing decisions to change the value of the bit, $H$, representing the hypothesized information bit error. If the decision is to complement $H$, then simultaneously all syndrome bits which include as a term the information bit corresponding to the bit in location $H$ are complemented. The locations of the complementing connections correspond to the particular convolutional code being employed. The examination and alteration of bits in the active memory therefore takes place in a narrow region, comprising the search point and the complemented region of the active memory, of a length equal to the code constraint length.

Figure 11:
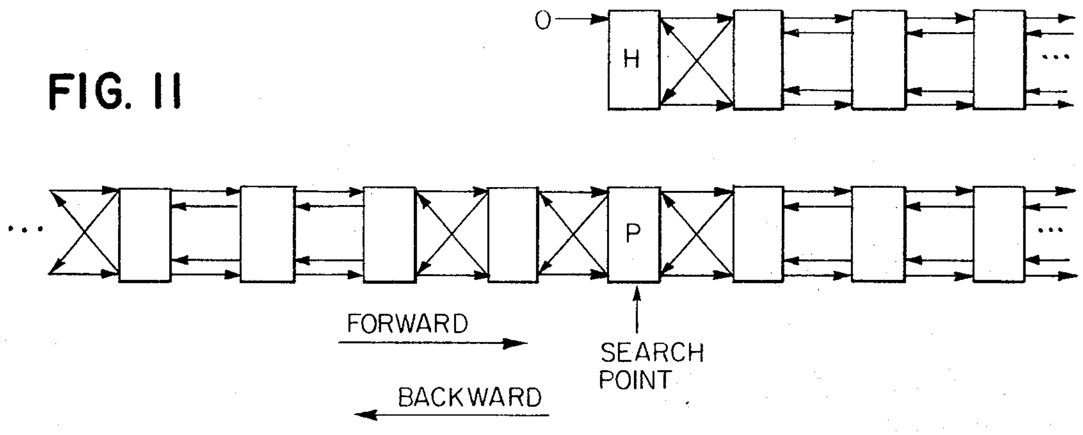
FIG. 11 is a schematical illustration of a portion of the active memory shown in FIG. 10.

The complementation of a hypothesized information bit error and of all syndrome bits having that information bit as a constituent occurs automatically, in the first embodiment, on each backward shift of the active memory. This is accomplished as shown in FIG. 11, by crossing the backward move connecting wires between the appropriate individual memory elements of the active memory.

The error count, on which the output decisions of the decoder logic circuitry are based, is not made as a direct count of the errors. Rather, a value called the metric, M, is maintained which is increased for each instance that no errors are hypothesized and decreased when errors are hypothesized. The value of the metric is maintained in a register or a series of registers (i.e., logic means) in the logic circuitry. In general, the logic continues with forward steps in the sequential decoding search as long as the metric remains positive, but when this is impossible searches backward to change previous hypotheses, to determine if there is a different set of hypotheses which would keep the metric positive.

In accordance with this preferred search algorithm, upon each forward move, the metric is updated according to the hypothesis of how many errors exist in the two bits, $H$ and $P$, at the search point. When the search is going forward the metric should be changed by $\Delta(i)$, where $i$ is the number of hypothesized errors in these two bits, and $\Delta(0)=+1$, $\Delta(1)=-4$, and $\Delta(2)=-9$. The two hypotheses consistent with a 0 syndrome bit at the search point are either $H=0, P=0$ (no errors) or $H=1$, $P=1$, (errors in both the information and parity bits constituents of that syndrome bit); the two consistent with a syndrome bit one at the search point are $H=0$, $P=1$ (one error) or $H=1$, $P=0$ (one error). When going forward the hypotheses with $H=0$ (no error in the received information bit) is always tried first; all syndrome bit ones being initially hypothesized to result from errors in received parity bits as mentioned above.

If a syndrome bit one actually has been caused by an error in an information bit, a number of subsequent syndrome bits will also have one values due to having this same information bit as a term. When too many syndrome bit ones occur to be consistent with the original hypothesis that they represent parity bit errors (i.e., when the metric would be lowered to a negative value), the sequential decoder search rules require backward moves and hypotheses of information bit errors. By choosing as metric increments +1 for no hypothesized errors, −4 for one hypothesized error, and −9 for two hypothesized errors, sequential decoding search paths with a high number of errors rapidly cause a drastic lowering of the metric (and consequently force backward moves with changed hypothesis) and thereby are rapidly abandoned.

A relatively error-free span of syndrome bits leads to an increased metric. It is then necessary to decrease the metric, so that it is never far from the 0 level, so that the decoder will quickly react to the presence of errors, indicated by syndrome bit one values.

The metric is kept near 0 level by detecting whenever the value of the metric increases from $(\Delta 0-1)$ to $\Delta 0$, where $\Delta 0$ is a design parameter called the "threshold spacing" (which, for this example, will be taken equal to 5), and then resetting the metric to 0. During operation, when the metric becomes negative, a backward move to the preceding pair of error hypotheses is initiated and a change is made of the previous hypothesis of $H=0$, the metric being adjusted at the same time, and then an attempt is made to go forward again, making the hypothesis of $H=1$. Should both possible single error hypotheses with a given pair of bits at the search point lead to negative metrics, another backward step is taken and the next previous hypothesis is changed to $H=1$. Should the decoder exhaust all possibilities going forward from a point where it had dropped the metric from $\Delta 0$ to 0, it returns the metric to $\Delta 0$ and attempts to go forward again. If a backward move brings an $H=1$ into the search point, the decoder automatically makes another backward move, since the $H=1$ indicates that both alternative single bit error hypotheses have already been tried with that pair of bits at the search point.

FIRST EMBODIMENT

A particularly simple implementation of the above search mode results when every backward move is used to force a change of hypothesis. In the diagram of FIG. 10, this amounts to complementing the bits which have been shifted into location $H$ and $P$ on each backward move before the next decision. In practice each affected bit would be complemented as it was shifted by simply crossing the backward wires as shown in FIG. 11.

It is convenient to have a flip-flop, F, which is set to one on each forward move and reset to 0 on each backward move, to aid in generating the sequential decoding decisions. The search rules of the first embodiment are then as illustrated in Table I. Here the notation $[M+1]$ means add 1 to $M$, unless $M=4$ in which case set $M$ to 0. For convenience an additional flip-flop T is used for the special case where the metric must be returned to $\Delta 0$.

It is also convenient to adopt the convention that on a backward move the "actual" $M$ is one less than the $M$ stored in the register ("actual" $M=M-\bar{F}$). Then forward-backward or backward-forward transitions which would otherwise require adding one to $M$ or subtracting one from $M$ can instead by implemented with no change in $M$.

TABLE I

| | Conditions | | | | Actions | | |
|---|---|---|---|---|---|---|---|
| | F | M | HP | T | Shift direction | Metric adjustment | T |
| 1 | 1 | ------ | ------ | 1 | B | ------ | |
| 2 | 1 | ≥0 | 00 | 0 | F | [M+1] | |
| 3 | 1 | ≥0 | 01 | 0 | F | M−4 | |
| 4 | 1 | <0 | ------ | ------ | B | ------ | |
| 5 | 0 | ------ | ------ | 1 | F | M+5 | Reset. |
| 6 | 0 | 0 | 11 | ------ | F | ------ | Set. |
| 7 | 0 | ≠0 | 11 | ------ | F | M−10 | |
| 8 | 0 | ------ | 10 | ------ | F | ------ | |
| 9 | 0 | ------ | 01 | ------ | B | M+4 | |
| 10 | 0 | ------ | 00 | 0 | B | M+9 | |

The utility of the flip-flop T may be illustrated as follows: when searching backward (i.e., $F=0$) with $H=1$, $P=1$, and $M=0$, the following sequence of moves is required by Table I:

Move 6: go forward, set T.

Move 1: go backward (automatically changing hypotheses to H=0 and P=0).

Move 5: go forward, increment M by 5, reset T. This combination of moves therefore succeeds in raising $M$ by $\Delta 0=5$ and forcing the search forward again with a hypothesis $H=0$ when we return to a point at which $M=0$ and the original syndrome was 0.

These rules can be implemented with digital circuitry as follows. It has been found to be convenient to use a special representation for the metric in which $M=M_1+5M_2+10M_3$, where $M_1$, $M_2$, and $M_3$ are integers, $0 \leq M_1 \leq 4$, $0 \leq M_2 \leq 1$, and $-1 \leq M_3$. $M_1$ is to be visualized as a five-state up-down counter with end-around shift, such as a five-stage ring counter. $M_2$ as a single flip-flop; and $M_3$ as an up-down counter whose lowest state is interpreted as $-1$. The counters are connected so that the following signals and their complements are available:

$M_{10}$ ($M_1=0$)

$M_{14}$ ($M_1=4$)

$M_2$ ($M_2=1$)

$M_{3-}$ ($M_3=-1$)

$M_{30}$ ($M_3=0$)

Then the following Boolean equations specify the logic actions [where $AB=(A$ and $B)$, $(A+B)=A$ and/or $B$, and $(\bar{A})$— not $A$]:

TABLE II

Shift forward and set $F$: $\bar{F}T+\bar{F}H+F\bar{M}_{3-}\bar{T}$

Shift backward and reset F: $FT+FM_{3-}+\bar{F}\bar{T}\bar{H}$

Reset $T$: $\bar{F}T$

Set $T$: $\bar{F}M_{10}\bar{M}_2M_{30}HP$

Count $M_1$ up: $F\bar{M}_{3-}\bar{T}$

Count $M_1$ down: $\bar{F}\bar{H}\bar{T}$

Figure 12:
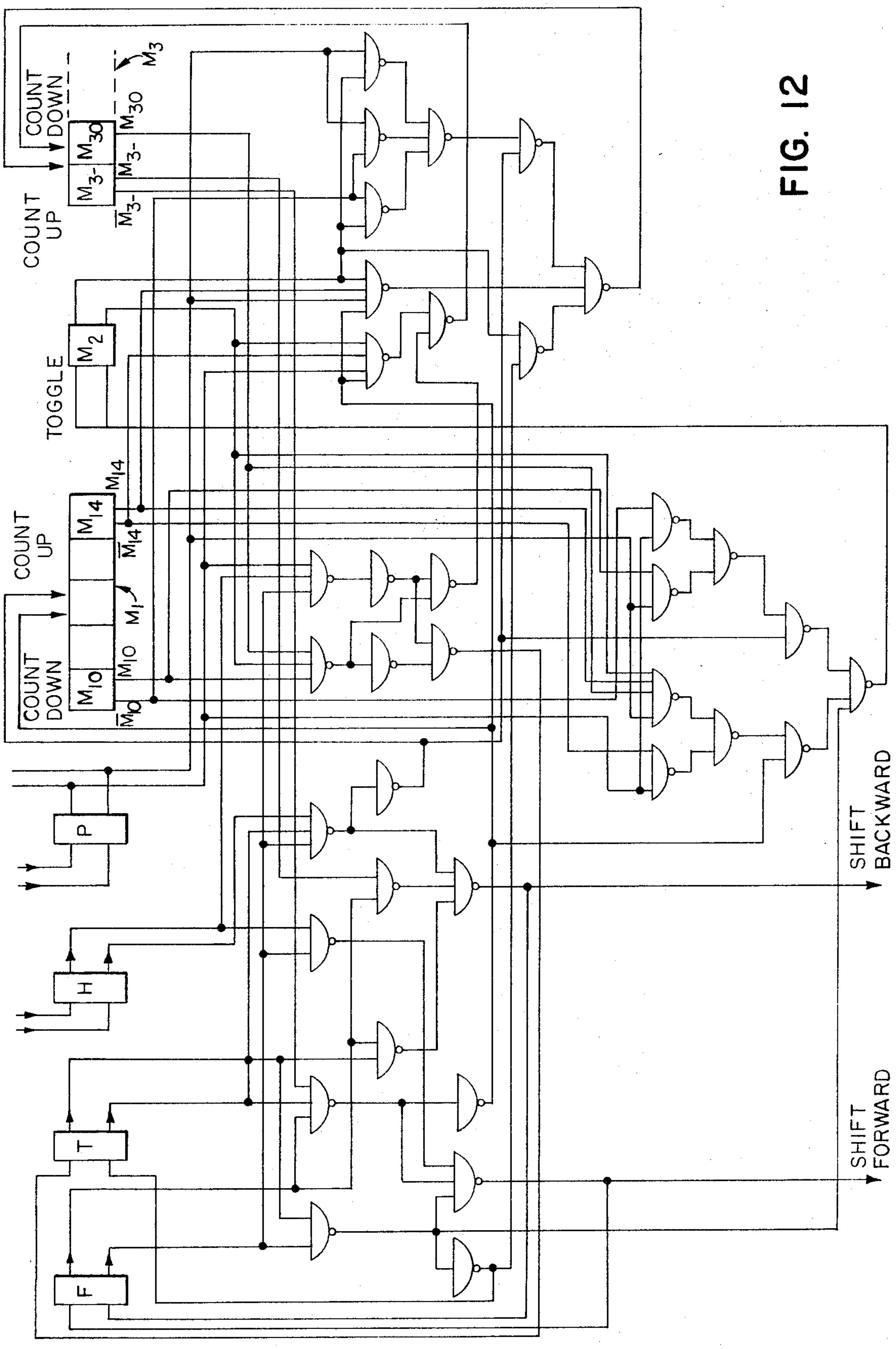
FIG. 12 is a schematic diagram of a decoder logic circuitry according to the invention.

Flip $M_2F\bar{M}_{3-}\bar{T}[\bar{P}M_{14}M_2M_{30}+P\bar{M}_{14}]+\bar{F}\bar{H}\bar{T}[P\bar{M}_{10}+\bar{P}M_{10}]+\bar{F}T$ Count $M_3$ up: $F\bar{M}_{3-}\bar{T}[\bar{P}M_{14}M_2+\bar{F}TM_2+\bar{F}\bar{H}\bar{T}[P\bar{M}_{10}M_2+\bar{P}(\bar{M}_{10}+M_2)]$ Count $M_3$ down: $F\bar{M}_{3-}\bar{T}[P\bar{M}_2\bar{M}_{14}]+\bar{F}HP[\bar{M}_{10}+M_2+\bar{M}_{30}]$ FIG. 12 illustrates a circuit, consisting only of NAND gates and JK flip-flops, which implements Table II. Both $M_1$ and $M_3$ are implemented as ring counters, with a single 1 in each. This circuit is clocked by an electronic clock (not shown). The algorithm implementation shown in Table II is sufficiently simple that the circuit of FIG. 12 performs its decision-making and bit-shifting and bit-altering functions (i.e., the examination of all conditions and the generation of all actions on any one line of Table I) in a clock cycle. The electronic clock is chosen to have a faster rate than the data transmission rate, thus permitting lengthy sequential decoding searches before the buffer memory fills and resychronization is required.

The simplification of the logic circuitry is most fundamentally due to (1) the realization that a syndrome device may advantageously be employed in sequential decoder, (2) the realization that with rate one-half and hard decisions the number of alternative possibilities is minimal, and (3) choosing as a first hypothesis no error in any given received information bit. By means of the latter feature, the value of the bit in location $H$ automatically indicates the history of the past decoding search history at that point: $H=1$ indicating that only the parity bit error hypothesis has been tried and $H=0$ indicating that both parity and information bit error hypotheses have been tried. In this embodiment, a further simplification results from syndrome complementation taking place only on backward moves.

With the choice of a rate one-half code with a "hard decision" as to the binary value of a received digit there are only four possible alternatives per received bit-group (e.g., per two associated bits in a rate one-half code, per the three associated bits in a rate one-third or a rate two-thirds code, etc.). That is, no errors, two errors, parity bit error only, and information bit error only. Since the same $\Delta(i)$ results from a single hypothesized error, be it information bit or parity bit error, only three possible metric changes exist per bit-group. It has been realized that limitation of the metric changes to a small number, say not to exceed ten, and preferably as low as three, is the key which allows use only of a specialized logic circuitry, such as shown in FIG. 12, which can be constructed of gates and flip-flops, and which can be clocked at a very rapid rate.

SECOND EMBODIMENT

Figure 14:
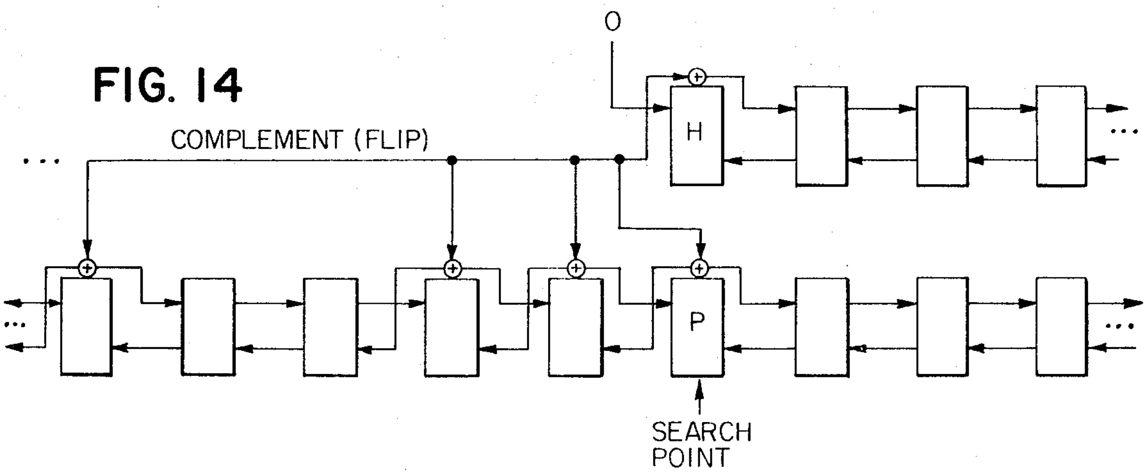
FIG. 14 is a schematical illustration of a portion of the active memory as in FIG. 11, suitable for use with an alternative embodiment of the decoder logic circuitry.
Figure 15:
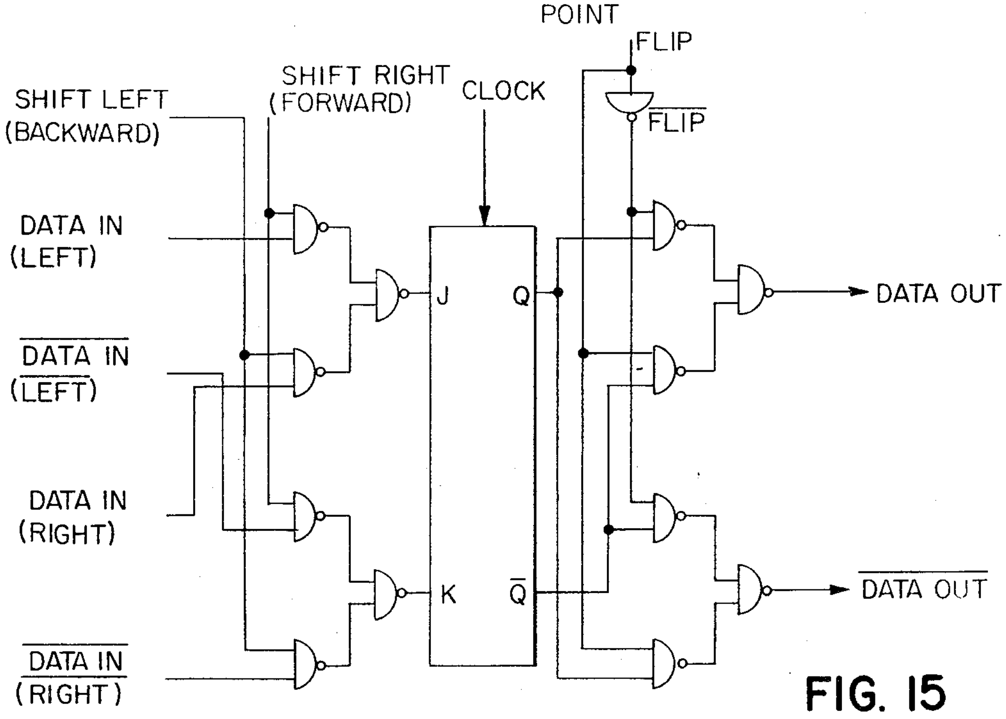
FIG. 15 is a schematic diagram of logic circuitry for a portion of FIG. 14.

A second embodiment will now be described, in order to show that hard decision inputs, as well as advantageously a rate one-half code and syndrome decoding, lead to a simple high-speed decoder even when the algorithm used is more complicated than that in the first embodiment. The second embodiment has a search algorithm which is essentially equivalent to the Fano algorithm. The principal complications over the first embodiment are: (1) choices must be made on each move whether to complement the information error hypothesis, $H$, at the search point, and with it all associated modified syndromes, as illustrated by the 'flip' line in FIG. 14 (the analogue of FIG. 11 for this embodiment); and (2) the algorithm recognizes in advance when the metric is about to become negative, so that it can avoid ever making a move which causes the metric to become negative. FIG. 15 shows in detail the gating necessary to accomplish complementation and left or right shift in one clock cycle.

As in the first embodiment, the metric $M$ is represented by three registers $M_1$, $M_2$, and $M_3$, with $M=M_1+5M_2+10M_3$, where $0 \leq M_1 \leq 4$, $0 \leq M_2 \leq 1$, and, in this case, $M_3 \geq 0$, since the metric never becomes negative. For simplicity $M_1$ is caused to be incremented (modulo 5) on every forward move and decremented on every backward move, with the result that on backward moves the integer $M=M_1+5M_2+10M_3$ will be one unit less than in the first embodiment. Its significance is otherwise the same. The algorithm is tailored to preserve this "modulo 5" property, in that all increments and decrements are either 5 or 10. Further, the value of $M_{14}$, that is, whether $M_1=4$ or not, is the only output from the register $M_1$ used in the algorithm.

A flip-flop A is included which has somewhat the same function as the 'flag' in the Fano algorithm. Either at startup, or whenever on a forward move $M=4$ and $P=0$, so that the next move will be of the type ($\Delta 0-1 \rightarrow \Delta 0 \leq 0$), the flip-flop A is set and for convenience $M$ is allowed to go to $M=5$ ($M_1=0$, $M_2=1$). Subsequently, as long as no apparent errors are encountered (i.e., $P=0$), the search proceeds forward, with no actions other than the steady incrementing of $M_1$, which will therefore merely cycle from 0 to 4 and back again. When an error is indicated (i.e., $P=1$), A is reset, $M_2$ is set to zero, and the decoder reenters its normal mode with $0 \leq M_1 \leq 4$. This scheme avoids the retrace back to $M=0$, incrementing of M to $\Delta 0 = 5$, and the retrace out to the error point which is necessary in the Fano algorithm. Another virtue of A is that it accounts for all occurrences of moves of the type ($\Delta 0 - 1 \rightarrow \Delta 0 \xrightarrow{set} 0$), so that the normal mode need not take account of such moves.

The second embodiment algorithm is tabulated in Table III. Again, a flip-flop $F$ tells whether the last move was forward ($F=1$) or backward. Because $M_1$ is always incremented on forward moves and decremented on backward moves, the Table shows only the adjustments to be made to $M'$, defined as equal to $M_2+2M_3$ (thus $M=M_1 5M'$). Decisions are made on the basis of the values of $M'$, $M_{14}$, $F$, A and $HP$.

TABLE III

| | Conditions | | | | | Actions | | | |
|---|---|---|---|---|---|---|---|---|---|
| | F | A | HP | $M_{14}$ | M′ | Next move | M′ | A | Flip |
| 1 | 1 | 1 | −0 | | | F | | | |
| 2 | 1 | | −0 | 0 | | F | | | |
| 3 | 1 | 0 | −0 | 1 | ≥1 | F | M′+1 | | |
| 4 | 1 | 0 | −0 | 1 | =0 | F | M′+1 | Set | |
| 5 | 1 | 1 | −1 | | | F | M′−1 | Reset | |
| 6 | 1 | | −1 | 0 | ≥1 | F | M′−1 | | |
| 7 | 1 | | −1 | 0 | =0 | B | | | |
| 8 | 1 | 0 | −1 | 1 | | F | | | |
| 9 | 0 | | 00 | | ≥2 | F | M′−2 | | √ |
| 10 | 0 | | 00 | 0 | ≤1 | B | | | |
| 11 | 0 | | 00 | 1 | =1 | B | M′−1 | | |
| 12 | 0 | | 00 | 1 | =0 | F | M′+1 | | |
| 13 | 0 | | 01 | | | F | | | √ |
| 14 | 0 | | 10 | 0 | | B | M′+1 | | √ |
| 15 | 0 | | 10 | 1 | | B | | | √ |
| 16 | 0 | | 11 | 0 | | B | M′+2 | | √ |
| 17 | 0 | | 11 | 1 | | B | M′+1 | | √ |

Figure 13:
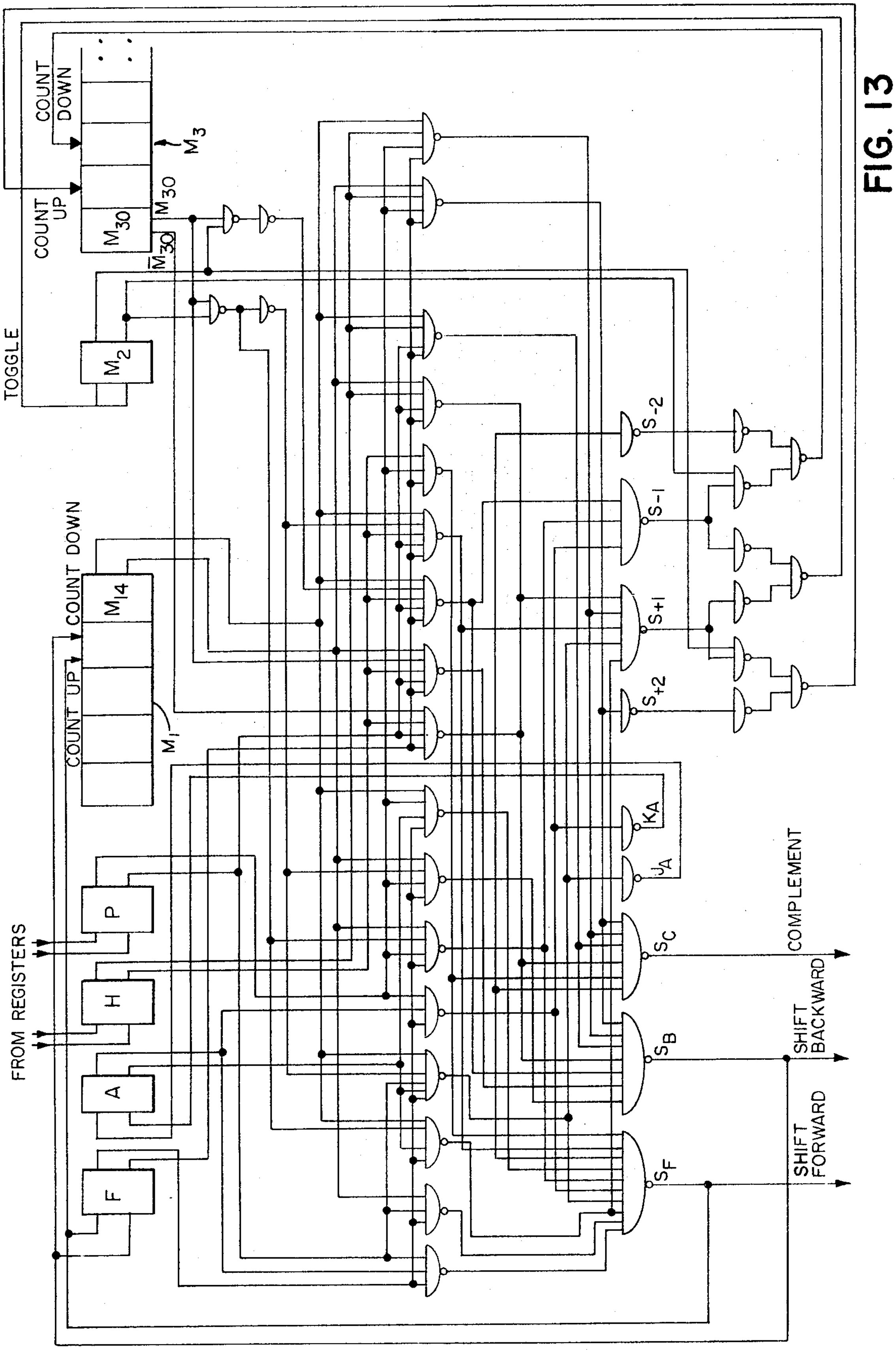
FIG. 13 is a schematic diagram of an alternative decoder logic circuitry according to the invention.

FIG. 13 shows a straightforward realization of Table III, using flip-flops and NAND gates only. As in FIG. 12, $M_1$ is considered to be a five-stage ring counter, $M_2$ a flip-flop, and $M_3$ another ring counter. In this realization gates first form the following metric functions as: (where $M_{30}$ denotes the condition $M_3=0$):

$$M_0\ (M'=0)=\bar{M}_2 M_{30}$$
$$M_0\ (M' \neq 0)=M_2+\bar{M}_{30}$$
$$M_1\ (M'=1)=M_2 M_{30}.$$

Seventeen NAND gates then pick off the conditions of the 17 lines of Table III: $FA\bar{P}$, $FP\bar{M}_{14}$, . . ., $\bar{F}HPM_{14}$. These are combined in a next level of NAND gates to provide the following signals:

$S_F$: shift forward, set $F$, increment $M_1$
$S_B$: shift backward, reset $F$, decrement $M_1$
$S_C$: complement the selected positions (FIG. 14 and 15)
$J_A$: set $A$
$K_A$: reset $A$
$S_{+2}$: increase $M'$ by 2
$S_{+1}$: increase $M'$ by 1
$S_{-1}$: decrease $M'$ by 1
$S_{-2}$: decrease $M'$ by 2

Finally, a last level of gates provides the necessary signals to adjust $M_2$ and $M_3$:

toggle $M_2$: $S_{+1}+S_{-1}$
count $M_3$ up: $M_2S_{+1}+S_{+2\ count}$ $M_3$ down: $M_2S_{-1}+S_{-2}$ This straightforward realization can be simplified and speeded up by techniques well-known in the art, according to whether speed or simplicity is most desired and according to the technological availability of logical building blocks (flip-flops, gates, etc.).

RESYNCHRONIZATION

A resynchronization procedure must be initiated whenever the decoder logic falls sufficiently behind in its sequential decoding search that correction bits are not available at the time they are needed for correcting of stored information bits. The use of a syndrome decoder allows a very simple resynchronization strategy which in the preferred embodiment amounts simply to an asynchronous reset of certain memory elements in the decoder, including all the active memory. (This type of strategy is not limited to a systematic code, or to syndrome decoders, although the syndrome feature is necessary for the implementation to be as simple as will be described below.)

Resynchronization is necessary because, in the situation described above, the decoder must jump ahead before it has finished decoding a certain section of data in order that the correction bits continue to be provided at a regular rate to error correction circuit 28 of FIG. 2. Since proper decoder operation depends upon the decoder's having at any time a correct estimate of the preceding constraint length of information bits, the decoder, when it jumps ahead, must in effect generate a hypothesis of the values of a constraint length of information bits. In a systematic code, a convenient hypothesis is to assume that a span of a constraint length of information bits was actually received correctly. The strategy to be described below implements such an assumption in a syndrome decoder. This strategy certainly succeeds whenever the assumption of a correct constraint length of information bits is actually correct. It also succeeds in some cases in which a few errors exist in this constraint length.

The preferred embodiment will be described with reference to the preferred decoder embodiment described above. It will be recalled that correction bits (corresponding to hypothesized information bit errors), modified syndrome bits, hypothesized parity bit errors, and temporarily stored fresh syndrome bits are stored in the active memory. At resynchronization time the contents of this memory are all set to zero, and the boundary (60 in FIG. 9) is reset to its forwardmost location (at which location an exchange with the buffer memory would normally be initiated). At the same time, flip-flop F (see FIG. 10) is set, and the "metric" is set to 0 (i.e.; $M_{10}=M_{30}=1$; $M_{11}=M_{12}=M_{13}=M_2=M_{31}=M_{32}=....=0$ in FIG. 12 or 13.) The combined effect of these asynchronous resets is to force the decoder into the same state which would have existed had there been no errors for a very long time. As a result, the subsequent behavior of the decoder is as follows:

1. An exchange will immediately be initiated, with the Q fresh syndrome bits entering the active memory, and Q correction bits (all of which will be 0) being transferred out. [Note that for an interval, equal to at least the length of the active memory, all correction bits will be 0, so that there will be errors in the decoded data precisely where there were errors in the received data. This is to be preferred over a resynchronization strategy in which during resynchronization the decoded data is random; this desirable feature occurs automatically in the preferred embodiment.]

2. The decoder will attempt to decode the fresh syndrome bits with its ordinary search rule. If there were no errors in the constraint length previous to the fresh syndrome bits, the syndrome bits will reflect only errors subsequent to the entry point and the decoder will be able to decode normally with high probability of searching forward rapidly. If, with a systematic code, there are information errors almost a full constraint length earlier, these will invert certain early syndrome bits, but since the effect is exactly the same as that of a few parity bit errors, the decoder may by interpreting these as parity bit errors be able to proceed all the same. If there are a few information bit errors just prior to the entry point, the decoder may even be able to correct them by searching back into the simulated past, interpreting the discrepancies introduced by the memory reset as particularly unfortunate channel errors.

3. If none of these conditions holds, the decoder will not be able to hypothesize a reasonable error pattern and will search back and forth without success. [Because the simulated past looks like a history of perfectly correct bits, the sequential decoding search rule prevents a search too far back, and no artificial boundary to the backward search is required.] Soon more correction bits will be requested, and the resynchronization procedure will then be automatically reinitiated. This cycle continues until the constraint length of bits preceding a fresh supply of Q syndrome bits is sufficiently free of errors that the decoder resumes normal operation as in 2). For this strategy to be practical, the average number of resynchronization trials must not be too large; that this condition obtains is due to the choice of rate one-half code and hard decisions to the binary value of the received bits. With these choices successive resynchronization attempts according to the present invention have been found to yield a lower average number of output errors per resynchronization than previous resynchronization strategies. In addition, the strategy does not require periodic insertion of a known constraint length of information bits in the transmitted data. This feature yields the following important advantages: (1) the hardware required to insert and remove such a sequence periodically is eliminated; (2) the information bit rate is not lowered by the proportion of these insertions to the information-carrying data bits; and (3) the ratio of information bit rate to transmitted data bit rate is precisely the code rate one-half in the preferred embodiment described above) which is a very desirable quality for compatibility with other system elements.

In summary, the only additional hardware required by the preferred embodiment in order to effect resynchronization is means for generating a master reset pulse and for applying this pulse to the active memory stages, as described. Besides the hardware simplicity, the advantages of the strategy include automatic zeroing of correction bits during resynchronization, ability to tolerate a few errors in the constraint length of information bits assumed correct, and lack of necessity of providing an artificial back search boundary. The strategy is also suitable for initial start up. It is equally applicable to syndrome decoders of non-systematic codes, where the effective assumption would be that no channel errors occurred in either bit stream (for a rate one-half code) in the previous (generally shorter) constraint length. It is equally applicable to syndrome decoders for codes of other rates, and to codes with non-binary outputs.

Several variations of this resynchronization strategy are possible. It is not necessary to set to 0 the entire buffer memory containing syndrome bits, but only sufficiently many bits extending up to the entry point that the probability of the decoder shifting back beyond the portion set to zero is acceptably low. In this case means should preferably be provided inhibiting the zeroing of correction bits during resynchronization, since they may not necessarily be zero. Also, rather than resynchronizing whenever the decoder is engaged in a search at the time Q correction bits are needed, if the appropriate Q correction bits are actually present in the active memory, means may be provided for interrupting the search, transferring these Q bits out and fresh syndrome bits in, and then resuming the search with an adjusted boundary, so as to continue the search to the last possible moment before resynchronization is absolutely essential.

NON-SYSTEMATIC CODES

As seen above, in the systematic encoder two data streams are generated. One has been called the information stream because it consists of the information bits themselves. The other is the parity stream which is a stream of parity check bits on certain subsets of previous information bits. In a non-systematic rate-1/2 code, by comparison, we again have two streams, but now both streams are parity streams, each formed as a stream of different parity check bits on a certain subsets of previous information bits.

Figure 16:
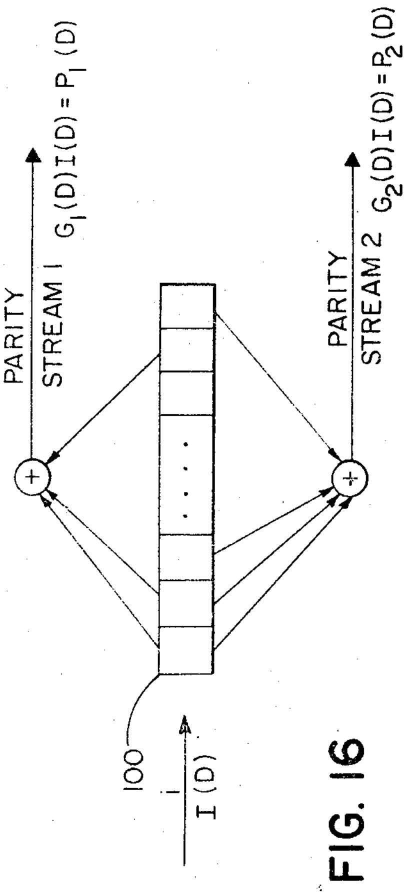
FIG. 16 is a schematic diagram of an encoder for a non-systematic convolutional code.

FIG. 16 illustrates an encoder for a simple non-systematic code. The information bits, i, enter register 100 which is sufficiently long that both parity checks may be generated without duplicating the register. In polynomial notation the input to register 100 is denoted by $I(D)$; then stream 1 will have its output denoted by $G_1(D)I(D)$ and stream 2 will have an output denoted by $G_2(D)I(D)$. These outputs will be called $P_1(D)$, $P_2(D)$, respectively. $G_1$(D) and $G_2$(D) are the so-called "-generators" for each of the parity check streams.

To decode, the existence of two polynomials $A(D)$ and $B(D)$ is assumed such that the equation $A(D)G_1(D)+B(D)G_2(D)=1$ is satisfied. (Actually, the left side of this equation need only be equal to $D^m$. The case of $m=0$, of course, gives 1.) In the systematic case $G_1(D)$ is just 1, implying that $P_1(D)$ is just $I(D)$ and thus this equation is always satisfied with $A(D)=1$ and $B(D)=0$. The systematic case, therefore, is just a special case of the non-systematic case.

Figure 17:
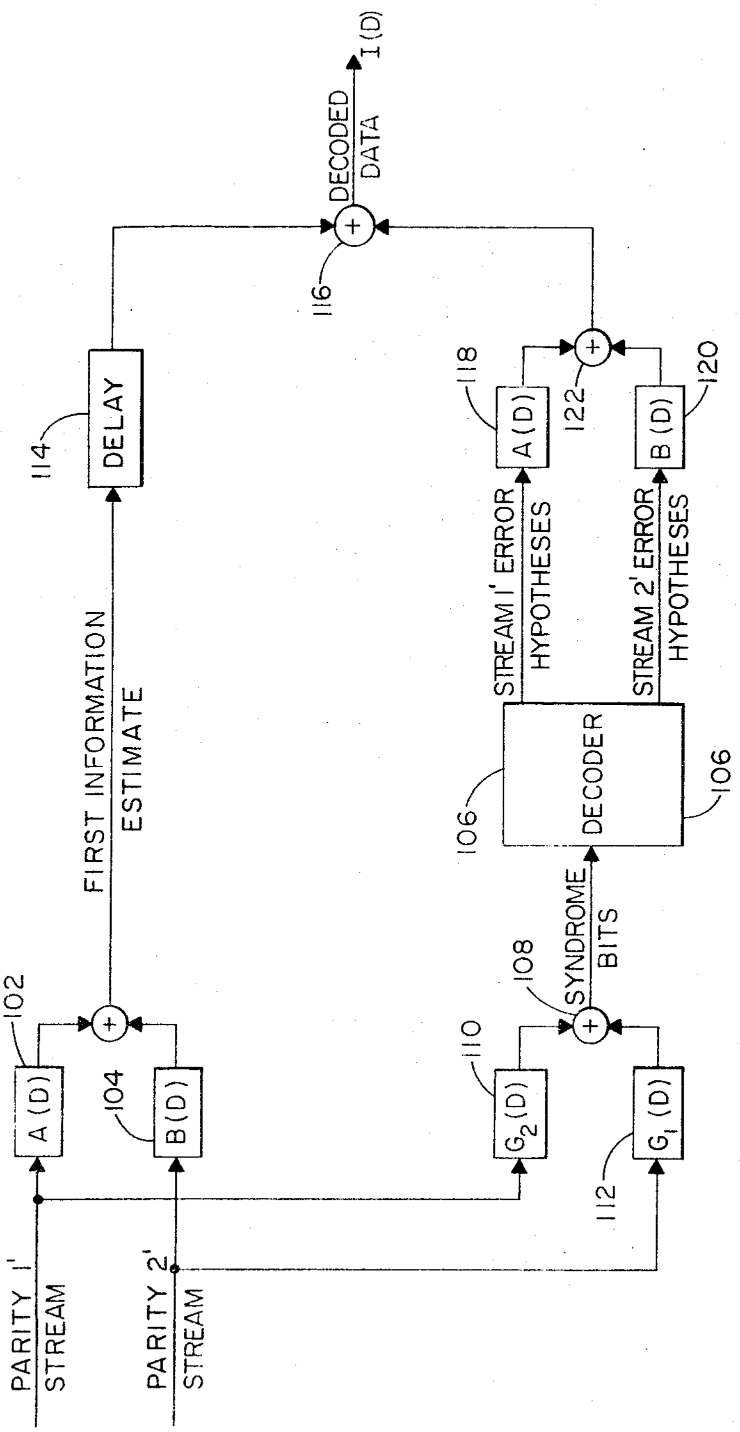
FIG. 17 is a block diagram of a decoder for a non-systematic convolutional code.

FIG. 17 illustrates a decoder for a non-systematic convolutional code. The received parity streams are denoted 1′ and 2′ and may be corrupted by errors. In polynomial notation, stream 1′ is $G_1(D)I(D)+E_1$(D) and stream 2′ is $G_2(D)I(D)+E_2(D)$; where $E_1(D)$ and $E_2(D)$ represent the channel errors. The received streams pass through shift registers 102 and 104 which realize the functions $A(D)$ and $B(D)$.

These devices are linear sequential circuits, just like encoders. After passing these two streams through $A(D)$ and $B(D)$ and adding them together, a bit sequence is obtained which in the absence of errors will actually be the encoded information sequence; as can be seen from the equation $A(D)G_1(D)+B(D)G_2(D)=1$. Since $A(D)$ and $B(D)$ are both polynomials, a finite number of decoding errors will cause only a finite number of errors to appear in these estimates of the information. This sum will be denoted the "first estimate of the transmitted information." (It should be understood that there has been no decoding done yet. This first estimate will be correct, however, in the absence of errors. The function of the decoder 106 is to generate correction bits for the errors that actually did occur.)

In the systematic case (where $A(D)$ is 1 and $B(D)$ is 0) this generation of the first estimate simply reduces to passing stream 1′ directly through as the first information estimate; i.e., the received bits in the first stream are taken as the first estimate of the information stream and if there are no errors they will indeed be the actual transmitted information stream.

Syndrome bits, the raw material for decoder 106, are generated by modulo 2 adder 108 having input lines from tapped locations in registers 110 and 112. Stream 1′ is put through register 110 which realizes the function $G_2(D)$ and stream 2′ is put through register 112 which realizes the function $G_1(D)$. The outputs of these registers are added together. The output of the adder 108 equals 0 in the absence of errors because $G_1(D)G_2(D)+G_2(D)G_1(D)=0$, modulo 2. (Again this corresponds, in the systematic case, to the reencoding where $G_1(D)$ is 1 and the parity bits are passed through unchanged. $G_2(D)$ is just a reencoding of the information bits so that the syndrome bits are formed, as discussed above, by a mod 2 adding of the reencoded information bit with the received parity bit.)

In FIG. 17 there is a fixed delay 114 for the first information estimate. Decoder 106, as in the systematic case, has a bulk buffer memory in which are stored both syndrome bits and correction bits; the two storage parts being of varying capacity but their sum being a constant.

These syndrome bits from adder 108 serve satisfactorily as syndromes in the mathematical sense, since they contain all error information not masked by the data, so the decoder can use them to look for the pattern of stream 1′ errors and stream 2′ errors which has minimum weight, or maximum likelihood, that could have caused the syndrome bit ones. The only modification in the sequential decoder for the non-systematic case is that in the modified syndrome bit section of the active memory there must be provision to modify the syndrome bits both (1) when a stream 1 error is hypothesized and the syndrome bits are modified by a set of taps equivalent to $G_2(D)$ and (2) a separate set of possible modifications corresponding to $G_1(D)$ for the case when a stream 2′ error is hypothesized. Actually both of these different possible modifications exist in the systematic decoder. The stream 2′ error modification is trivial, however, since it simply involves setting a certain single bit to one whenever there is a hypothesized parity error. In a non-systematic decoder a hypothesized stream 1' error requires complementation of a certain subset of bits in the modified syndrome bit region of the active memory, and a hypothesized stream 2' error requires complementation of a different subset, according to $G_2(D)$ and $G_1(D)$ respectively. Otherwise the sequential decoding logic is the same as in the systematic case.

Again there is a register in which are stored bits representing hypothesized stream 1' errors and hypothesized stream 2' errors. The only further modification that is made to the sequential decoder is that the stream 1' error hypotheses must be multiplied by $A(D)$ in register 118 and the stream 2' error hypotheses multiplied by $B(D)$ in register 120 and the resulting bit streams must be added together by mod 2 adder 122 to form a single stream. This stream, by the property of the equation $A(D)G_1(D)+B(D)G_2(D)=1$, will in fact serve as appropriate correction bits for the first information estimate and are added mod 2 to that estimate in error correcting circuit 116 to give decoded data exactly as in the systematic case.

The advantage in sequential decoding of using a non-systematic code is that only with the non-systematic code can one achieve, in theory, the minimum error probability for a given constraint length; whereas in the systematic case the sequential decoding algorithm results in a degradation over the optimum. A further advantage is that one can get away with a slightly shorter equivalent constraint length. In general the decoder register can be less than half as long when one goes to rate-one-half non-systematic codes.

This decreased register length is of advantage in resynchronization. Resynchronization is carried out with a non-systematic code precisely as it is with the systematic code. The active memory of the decoder, including the stream 1' and 2' error hypotheses and the modified syndrome bits, are all just set to 0. This has the effect of assuming that there are no errors in both stream 1' and stream 2' for the past constraint length. In general, one would expect that length for each stream to be less than half as long as in the systematic case so that somewhat fewer bits have to be error-free for resynchronization certainly to work.

The disadvantage of a non-systematic code is that when resynchronization is required and all the correction bits are set to zero the bits remaining in the decoded data during that time are the product of the actual errors occuring in the first stream with $A(D)$, $E_1(D)A(D)$, plus the errors occuring in the second stream times $B(D)$, $E_2(D)B(D)$. Since $A(D)$ and $B(D)$ must each have at least one term in the non-systematic case, this means that at least twice as high an error density will occur during decoding failures in the non-systematic case. Usually, however, one can choose $G_1(D)$ and $G_2(D)$ so that $A(D)$ and $B(D)$ have precisely one term.

In many respects the non-systematic and systematic case decoders are identical. The search algorithms are precisely the same. The fact that there are two registers storing stream 1' error hypotheses and stream 2' error hypotheses is precisely the same. The fact that there is a modified syndrome bit register extending off conceptually to the left of these two registers is precisely the same.

An important feature of the embodiment of the non-systematic syndrome decoder shown in FIG. 17 is the use of registers realizing $A(D)$ and $B(D)$ in the decoder's input circuit and also at the output of the active decoder. This reduces the volume of the streams of data to be delayed to only one stream of data; vis., the "first information estimate." Thus the decoder receives just the syndrome bits as in the systematic case. Finally, only one stream of correction bits is stored, rather than separate streams for both streams 1' and stream 2'.

CONCLUDING DISCUSSION

In the field of error correction, sequential decoding was developed as a means of achieving more efficient transmission than is attainable with other systems, but with greatly increased complexity of procedure and apparatus. The numerous considerations such as integrating the equipment into existing systems, equipment cost limitations, and the time required for performing the error correction procedure had been in such apparent conflict as to make sequential decoding appear inapplicable to most practical communications networks.

The prior art has tended to contemplate low rate codes and soft (multi-level quantized) decisions for use with a sequential decoder on satellite communication networks because the basic communication efficiency is maximized with these choices. However, as described herein, it has been realized that a seemingly unfortunate choice of these parameters (viz., a rate one-half code with binary hard decision quantization) leads to an effective and practical system capable of on-line operation at extremely high rates of data transfer. It is compatible with existing equipment, is simply instrumented, and is recognized as a solution to the problem of transferring digital data and the like through satellite communications channels and other channels subject to random noise.

It will be understood that changes to various features are within the more general aspects of the invention. To name only two, the system is applicable to non-systematic convolutional codes and to rates other than one-half, with provisions for appropriate memory segments in the decoder.

Other embodiments will occur to those skilled in the art and are within the following claims.

What is claimed is:

1. In an error correction decoder constructed to decode digital data, the data encoded by a predetermined convolutional code, the code, the decoder operating according to a sequential decoding search rule in which a search of variable duration is made by sequential decoder logic circuitry through an undecoded sequence residing in a memory, said undecoded sequence derived from received data, the search producing a decoded sequence; the improvement wherein said decoder has an input line for digital binary data with each bit representing a hard decision as to the binary value of a received signal, said decoder constructed to decode binary data encoded according to a convolutional error correcting code, said decoder including a syndrome bit former constructed to form a sequence of syndrome bits from said digital data, said syndrome bit sequence being said undecoded sequence, said sequential decoder logic circuitry operating only on said syndrome bit sequence.

2. The error correction decoder of claim 2 for use with a rate 1/2 code wherein said sequential decoder logic circuitry examines and modifies said undecoded sequence, said decoder logic circuitry including logic means constructed to examine a first set of bits in a predetermined narrow region of said undecoded sequence, altering means to alter a second set of bits in said region, and shifting means for shifting said undecoded sequence backward and forward to bring bits as required by the search rule into said region, said logic means adapted to generate a decision as to the nature of any shift and whether or not to alter the bits and to cause said shifting and altering operations in accordance with said decisions, said decoder logic circuitry clocked by an electronic clock to cause operation of all of said logic means, altering means, and shifting means in one clock cycle.

3. The error correction decoder of claim 2 wherein said logic means consists only of interconnected flip-flops and gates.

4. The error correction decoder of claim 1 wherein said decoder comprises an input circuit comprising said syndrome bit former, a buffer memory connected to receive and store said syndrome bit sequence from said input circuit, said buffer memory comprising variable length segments for storage of said syndrome bit sequence and of said decoded sequence, a separate active memory connected to said buffer memory, said logic circuitry connected to produce demand signals and said buffer memory responsive to said demand signals to supply the earliest bits of said undecoded sequence to and remove bits of said decoded sequence from said active memory, said buffer memory having an output for the earliest bits of said decoded sequence, said sequential decoder logic circuitry interconnected with said active memory to perform its search by progressive examination and modification of the bits of said undecoded sequence stored at any given time in said active memory, said active memory having a storage capacity equal to at least a plurality of constraint lengths of said convolutional code, said buffer memory having a substantially larger storage capacity than said active memory; said decoder also including a memory segment for uncorrected information bits and combinational circuitry adapted to combine said decoded sequence with data from said memory to produce a stream of corrected data, said decoder logic circuitry capable of shifting said bits in said active memory at a certain shifting speed greater than the speed of delivery of bits by said input circuit to said buffer memory.

5. The error correction decoder of claim 1 including means for automatically resynchronizing said decoder logic circuitry upon the occurrence of a demand for output of data not finally decoded, said means constructed and arranged to fill at least a portion of said memory with digits indicating a preceding error-free space to permit recommencement of the decoding procedure.

6. The error correction decoder of claim 1 wherein said decoder logic circuitry is constructed to cause a change in the hypothesized error pattern for every backward move in the sequential decoding search.

7. The error correction decoder of claim 1 wherein said syndrome bit former is included in an input circuit for a buffer memory, said buffer memory is constructed to store a substantial length of the syndrome bit sequence, and said buffer memory is connected to deliver said syndrome bits to said logic circuitry.

8. The error correction decoder of claim 1 including a buffer memory for said undecoded and decoded sequences, said buffer memory comprising two chains of series-connected shift registers, a cross-transfer circuit connected to transfer the bits in each chain to the other chain at pre-selected locations along the length of said chains, logic means to change the location of said cross-transfer in a corresponding direction along the length of each chain to define two delay paths each comprising a portion of both said chains, the directions of shift of the two chains being such that as the length of one delay path increases a given amount the length of the other delay path decreases by the same amount and vice versa, said buffer memory connected to deliver bits of said undecoded sequence to said logic circuitry and to receive bits of said decoded sequence from said logic circuitry.

9. The error correction decoder of claim 8 wherein said series-connected shift registers are one-way shift registers and said logic means comprises a two-way shift register having as many stages as there are registers in each of said chains.

10. In an error correction decoder constructed to decode digital data, the data encoded by a predetermined convolutional code, the decoder operating according to a sequential decoding search rule in which a search of variable duration is made by sequential decoder logic circuitry through an undecoded sequence residing in a memory, said undecoded sequence equal to or derived from received data, the search producing a decoded sequence; the improvement wherein said decoder includes a syndrome bit former to form a syndrome bit sequence, said undecoded sequence comprising said syndrome bit sequence, and said decoder logic circuitry is constructed to alter syndrome bits in accordance with said sequential decoding search rule and produce said decoded sequence, said decoder including automatic resynchronization means comprising means effectively to set to zero each of the syndrome bits, modified syndrome bits, and bits of said decoded sequence in at least a constraint length of the bit stream comprising said undecoded and decoded sequences.

11. In an error correction decoder capable of use with a communications channel between two earth stations via a communications satellite, said decoder constructed to decode digital data, the data encoded by a predetermined convolutional code, the decoder operating according to a sequential decoding search rule in which a search of variable duration is made by sequential decoder logic circuitry through an undecoded sequence residing in a memory, said undecoded sequence equal to or derived from received data, the search producing a decoded sequence; the improvement wherein said decoder decodes digital data continuously as it is received from the transmission channel, said decoder having an input line for digital binary data with each bit representing a hard decision as to the binary value of a received signal, said decoder comprising an input circuit constructed to obtain an undecoded binary sequence from said digital data, a buffer memory connected to receive and store said undecoded sequence from said input circuit, said buffer memory having constant length and comprising variable length segments for storage of said undecoded sequence and of said decoded sequence, a separate active memory of constant length connected to said buffer memory, said logic circuitry connected to produce demand signals and said buffer memory responsive to said demand signals to supply the earliest bits of said undecoded sequence to and remove bits of said decoded sequence from said active memory, said buffer memory having an output for the earliest bits of said decoded sequence, said sequential decoder logic circuitry interconnected with said active memory to perform its search by progressive examination of the bits of said undecoded sequence stored at any given time only in said active memory, said active memory having a storage capacity equal to at least a plurality of constraint lengths of said convolutional code, said buffer memory having a substantially larger storage capacity than said active memory.

12. The error correction decoder of claim 11 in which said sequential decoder logic circuitry examines and modifies the contents of said active memory, said active memory having two memory ranks corresponding to the two streams of a rate 1/2 binary convolutional code, said decoder logic circuitry including logic means constructed to examine a first set of bits in a predetermined narrow region of said two ranks, altering means to alter a second set of bits in said region, and shifting means for shifting the contents of said memory ranks backward and forward to bring bits as required by the search rule into said region, said logic means adapted to generate a decision as to the nature of any shift and whether or not to alter the bits and to cause said shifting and altering operations in accordance with said decisions, said decoder logic circuitry clocked by an electronic clock to cause collective operation of said logic means, altering means, and shifting means in one clock cycle.

13. The error correction decoder of claim 12 wherein said logic means consists only of interconnected flip-flops and gates.

14. The error correction decoder of claim 12 wherein said decoder logic circuitry is capable of shifting said bits in said active memory at a certain shifting speed greater than the speed of delivery of bits by said input circuit to said buffer memory.

15. The decoder of claim 1 including means for automatically resynchronizing said decoder logic circuitry upon the occurrence of a demand for output of data not finally decoded, said means constructed and arranged to fill a portion of said active memory corresponding at least to a constraint length of said predetermined convolutional code with digits indicating a preceding error-free space to permit recommencement of the decoding procedure.

16. The error correction decoder of claim 11 including a syndrome bit former constructed to form a sequence of syndrome bits, said undecoded sequence comprising said syndrome bits and syndrome bits as modified by previous error hypotheses, said decoder logic circuitry constructed to progressively examine and modify said undecoded sequence, said logic circuitry constructed to form said decoded sequence as binary values which indicate the error values for respective bits of said received data, said decoder also including a received data memory segment and combinational circuitry connected to combine said decoded sequence with data from said data memory segment to produce a stream of corrected data.

17. The error correction decoder of claim 16 wherein said syndrome bit former is included in said input circuit for said buffer memory, and said buffer memory is connected to transfer only syndrome bits to said active memory.

18. The error correction decoder of claim 17 for use with a systematic code in which certain bits of said received data comprise the undecoded information sequence, said decoder including an information sequence delay means connected to receive said information sequence after use in said syndrome bit former, said delay means constructed to delay said undecoded information sequence by a constant amount preceding said combinational circuitry in which said information sequence is corrected.

19. The error correction decoder of claim 11 wherein said buffer memory comprises two chains of series-connected shift registers, a cross-transfer circuit connected to transfer the bits in each chain to the other chain at pre-selected locations along the length of said chains, logic means to change the location of said cross-transfer in a corresponding direction along the length of each chain to define two delay paths each comprising a portion of both said chains, the directions of shift of the two chains being such that as the length of one delay path increases a given amount the length of the other delay path decreases by the same amount and vice versa.

20. The error correction decoder of claim 19 wherein said series-connected shift registers are one-way shift registers and said logic means comprises a two-way shift register having as many stages as there are registers in each of said chains.

21. The error correction decoder of claim 11 wherein said decoder logic circuitry is constructed to cause a change in the hypothesized error pattern for every backward move in the sequential decoding search.

* * * * *